US 10,645,416 B2

United States Patent
Min et al.

(10) Patent No.: US 10,645,416 B2
(45) Date of Patent: May 5, 2020

(54) METHOD AND APPARATUS FOR ENCODING AND DECODING AN IMAGE USING A MODIFIED DISTRIBUTION OF NEIGHBORING REFERENCE PIXELS

(71) Applicant: SAMSUNG ELECTRONICS CO., LTD., Suwon-si (KR)

(72) Inventors: Jung-hye Min, Yongin-si (KR); Elena Alshina, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/573,180

(22) PCT Filed: May 4, 2016

(86) PCT No.: PCT/KR2016/004714
§ 371 (c)(1),
(2) Date: Nov. 10, 2017

(87) PCT Pub. No.: WO2016/182266
PCT Pub. Date: Nov. 17, 2016

(65) Prior Publication Data
US 2018/0131964 A1    May 10, 2018

Related U.S. Application Data

(60) Provisional application No. 62/160,169, filed on May 12, 2015.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/593; H04N 19/105; H04N 19/11; H04N 19/117; H04N 19/182;
(Continued)

(56) References Cited

U.S. PATENT DOCUMENTS 5,991,449 A  * 11/1999 Kimura ............... H04N 19/593
                                                         375/E7.265
8,126,282 B2     2/2012 Jung et al.
(Continued)

FOREIGN PATENT DOCUMENTS

EP         2 658 263     * 10/2013   ............... H04N 7/34
EP         2 658 263 A2   10/2013
(Continued)

OTHER PUBLICATIONS

Seo et al., "Bi-Intra Prediction using slope information", Joint Collaborative Team on Video Coding (JCT-VC) of ITU-T SG16 WP3 and ISO/IEC JTC1/SC29/WG11, 4th Meeting, Daegu, Republic of Korea, Jan. 20-Jan. 28, 2011, 6 pages; XP030008327; URL: http://wftp3.itu.int/av-arch/jctvc-site.
(Continued)

*Primary Examiner* — Maria E Vazquez Colon
(74) *Attorney, Agent, or Firm* — Sughrue Mion, PLLC

(57) ABSTRACT

A video decoding apparatus according to an embodiment may include: a receiver configured to receive a bitstream of an encoded video; a predictor configured to change a distribution of pixel values of neighboring reference pixels that are previously decoded, and generate a prediction block by performing intra prediction on a current block by using the neighboring reference pixels the distribution of the pixel values of which is changed; and a decoder configured to reconstruct the current block based on residual data obtained from the bitstream and the prediction block.

15 Claims, 21 Drawing Sheets

(51) Int. Cl.
  *H04N 19/182*     (2014.01)
  *H04N 19/11*      (2014.01)
  *H04N 19/70*      (2014.01)
  *H04N 19/82*      (2014.01)
  *H04N 19/117*     (2014.01)
  *H04N 19/176*     (2014.01)
  *H04N 19/463*     (2014.01)

(52) U.S. Cl.
  CPC ......... *H04N 19/117* (2014.11); *H04N 19/182* (2014.11); *H04N 19/70* (2014.11); *H04N 19/82* (2014.11); *H04N 19/176* (2014.11); *H04N 19/463* (2014.11)

(58) Field of Classification Search
  CPC ...... H04N 19/70; H04N 19/82; H04N 19/176; H04N 19/463
  See application file for complete search history.

(56) References Cited

U.S. PATENT DOCUMENTS

| | | | | |
|---|---|---|---|---|
| 8,559,734 B2* | 10/2013 | Ohnishi | ................. | H04N 19/61 382/232 |
| 8,953,682 B2 | 2/2015 | Chen et al. | | |
| 2005/0276496 A1* | 12/2005 | Molgaard | ............ | H04N 19/105 382/244 |
| 2006/0045182 A1* | 3/2006 | Yokose | ................ | H04N 19/197 375/240.12 |
| 2008/0205778 A1* | 8/2008 | Tokumitsu | .......... | H04N 19/105 382/236 |
| 2009/0087111 A1* | 4/2009 | Noda | ............... | H04N 21/23892 382/238 |
| 2010/0215102 A1* | 8/2010 | Takamura | .............. | H04N 19/94 375/240.12 |
| 2011/0262037 A1* | 10/2011 | Ohnishi | ................. | H04N 19/61 382/166 |
| 2012/0039389 A1* | 2/2012 | Sjoberg | ................ | H04N 19/105 375/240.03 |
| 2013/0114674 A1* | 5/2013 | Chong | ................... | H04N 19/86 375/240.02 |
| 2013/0136173 A1* | 5/2013 | Matsunobu | .......... | H04N 19/176 375/240.08 |
| 2014/0211845 A1* | 7/2014 | Lei | ....................... | H04N 19/159 375/240.02 |
| 2016/0105685 A1* | 4/2016 | Zou | ..................... | H04N 19/117 375/240.12 |
| 2016/0234498 A1* | 8/2016 | Misra | .................... | H04N 19/46 |

FOREIGN PATENT DOCUMENTS

| | | | |
|---|---|---|---|
| EP | 2658263 A2 * | 10/2013 | ........... H04N 19/105 |
| EP | 2 773 116 A1 | 9/2014 | |
| JP | 2010176239 A | 8/2010 | |
| JP | 2011233972 A | 11/2011 | |
| JP | 2013135366 A | 7/2013 | |
| KR | 1020090083716 A | 8/2009 | |
| KR | 1020090132474 A | 12/2009 | |

OTHER PUBLICATIONS

Nan et al., "Spatial Prediction Based Intra-Coding", IEEE International Conference on Multimedia and Expo (ICME), IEEE, Jun. 27-Jun. 30, 2004, vol. 1, pp. 97-100, XP010770753.

Communication dated Jan. 29, 2018, issued by the European Patent Office in counterpart European application No. 16792912.4.

International Search Report and Written Opinion (English Translation of PCT/ISA/210 and PCT/ISA/237), dated Aug. 12, 2016 by the International Searching Authority in counterpart International Application No. PCT/KR2016/004714 (English Translation of ISA/210, 220, and 237).

* cited by examiner

FIG. 15
PARTITION MODE INFORMATION (1500)
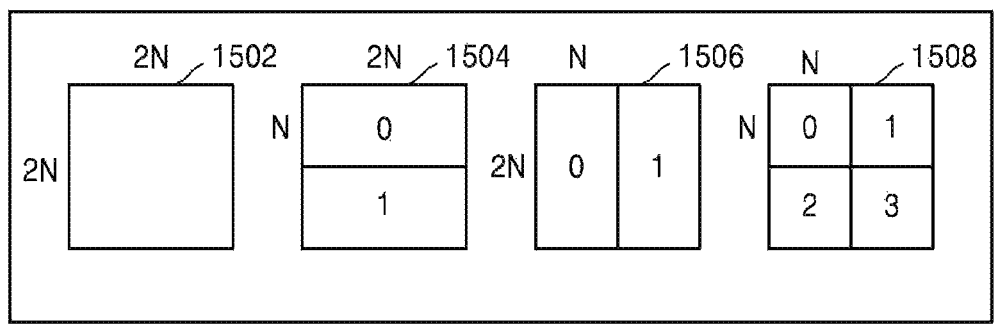
PREDICTION MODE INFORMATION (1510)
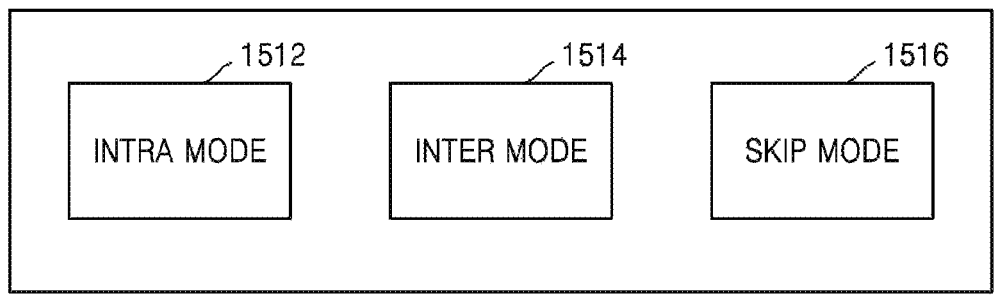
TRANSFORMATION UNIT SIZE INFORMATION (1520)
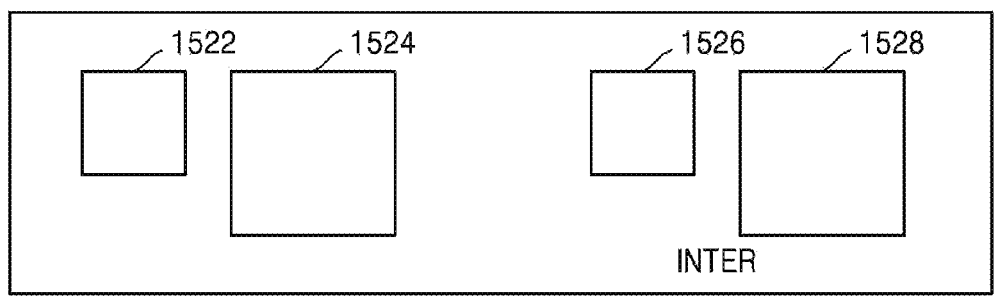

CODING UNIT (1710)

PREDICTION UNIT (1760)

TRANSFORMATION UNIT (1770)

METHOD AND APPARATUS FOR ENCODING AND DECODING AN IMAGE USING A MODIFIED DISTRIBUTION OF NEIGHBORING REFERENCE PIXELS

TECHNICAL FIELD

The present invention relates to encoding and decoding of an image, and more particularly, to methods and apparatuses for encoding and decoding an image through intra prediction which may improve image compression efficiency by performing intra prediction by using neighboring reference pixels, a distribution of pixel values of which is changed.

BACKGROUND ART

According to an image compression method, such as moving picture expert group (MPEG)-1, MPEG-2, MPEG-4, or H.264/MPEG-4 advanced video coding (AVC), a picture is split into macroblocks in order to encode an image. After each of the macroblocks is encoded in any of inter prediction and intra prediction encoding modes, an appropriate encoding mode is selected according to a bit rate required for encoding each macroblock and an allowable distortion between an original macroblock and a decoded macroblock, and then each macroblock is encoded in the selected encoding mode.

As hardware for reproducing and storing high resolution or high quality video content is being developed and supplied, a need for a video codec for effectively encoding or decoding the high resolution or high quality video content is increasing. According to a conventional video codec, a video is encoded in a limited prediction mode based on a macroblock having a predetermined size.

In an intra prediction mode, a current block may be predicted by referring to neighboring reference pixels that are reconstructed earlier than the current block to be predicted. Since a difference between pixel values of the current block and a prediction block predicted by using intra prediction is represented as residual data, encoding efficiency and decoding efficiency may be improved.

DETAILED DESCRIPTION OF THE INVENTION

Technical Problem

There may be provided a method and apparatus for encoding and decoding a video through intra prediction by using neighboring reference pixels, a distribution of pixel values of which is changed.

There may also be provided a computer-readable recording medium having embodied thereon a program for executing a method of encoding and decoding a video in a computer. Technical problems to be solved by the present embodiment are not limited to the above-described technical problems and one of ordinary skill in the art will understand other technical problems from the following embodiments.

Technical Solution

A video decoding apparatus according to an embodiment may include: a receiver configured to receive a bitstream of an encoded video; a predictor configured to change a distribution of pixel values of neighboring reference pixels that are previously decoded, and generate a prediction block by performing intra prediction on a current block by using the neighboring reference pixels the distribution of the pixel values of which is changed; and a decoder configured to reconstruct the current block based on residual data obtained from the bitstream and the prediction block.

The predictor may be further configured to change the distribution by dividing the neighboring reference pixels into a plurality of sets, based on the pixel values of the neighboring reference pixels, and changing pixel values of pixels included in each of the plurality of sets by using a predetermined offset value for each set.

The predictor may be further configured to change the distribution by dividing the neighboring reference pixels into a first set in which pixels having pixel values less than an average value of the pixel values of the neighboring reference pixels are included and a second set in which pixels having pixel values greater than the average value are included, and adding a first offset value to the pixel values of the pixels included in the first set and adding a second offset value to the pixel values of the pixels included in the second set, wherein each of the first offset value and the second offset value is a positive number or a negative number.

The receiver may be further configured to obtain a first flag including information about whether the distribution of the pixel values of the neighboring reference pixels is to be changed from the bitstream, and the predictor may be further configured, when the first flag indicates that the distribution is to be changed, to change the distribution of the pixel values of the neighboring reference pixels, and when the first flag does not indicate that the distribution is not to be changed, not to change the distribution of the pixel values of the neighboring reference pixels.

The receiver may be further configured to, when the first flag indicates that the distribution is to be changed, obtain a second flag indicating any mode from among a plurality of modes indicating a method of changing the distribution of the pixel values from the bitstream, and the predictor may be further configured to change the distribution, according to the mode indicated by the second flag.

When the current block is an N×N block having a width and a height of N (where N is a positive number), the neighboring reference pixels may include N×4+1 neighboring pixels including N+1 neighboring pixels located in an upper corner adjacent to the current block, N neighboring pixels located in an upper-right corner adjacent to the current block, N neighboring pixels located in a left corner adjacent to the current block, and N neighboring pixels located in a lower-left corner adjacent to the current block.

A video encoding apparatus according to an embodiment may include: a predictor configured to change a distribution of pixel values of a plurality of neighboring reference pixels that are previously encoded and generate a prediction block by performing intra prediction on a current block by using the plurality of neighboring reference pixels the distribution of the pixel values of which is changed; and an encoder configured to generate a bitstream by encoding residual data between the prediction block and the current block.

A video decoding method according to an embodiment may include: receiving a bitstream of an encoded video; changing a distribution of pixel values of neighboring reference pixels that are previously decoded; generating a prediction block by performing intra prediction on a current block by using the neighboring reference pixels the distribution of the pixel values of which is changed; and reconstructing the current block based on residual data obtained from the bit stream and the prediction block.

A video encoding method according to an embodiment may include: changing a distribution of pixel values of a plurality of neighboring reference pixels that are previously encoded; generating a prediction block by performing intra prediction on a current block by using the plurality of neighboring reference pixels the distribution of the pixel values of which is changed; and generating a bitstream by encoding residual data between the prediction block and the current block.

A computer-readable recording medium having embodied thereon a program for executing the video decoding method or the video encoding method in a computer may be provided.

DESCRIPTION OF THE DRAWINGS

FIG. 15 illustrates a plurality of pieces of encoding information according to an embodiment.

MODE OF THE INVENTION

Figure 1A:
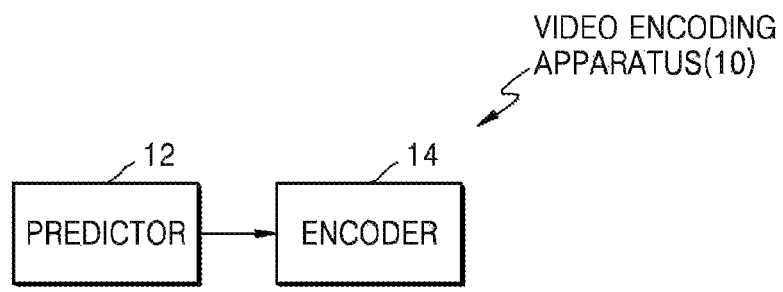
FIG. 1A is a block diagram of a video encoding apparatus according to an embodiment.

Preferred embodiments of the present invention will now be described more fully with reference to the accompanying drawings. Advantages and features and methods of accomplishing the same may be understood more readily by reference to the following detailed description of preferred embodiments and the accompanying drawings. The invention may, however, be embodied in different forms and should not be construed as limited to the embodiments set forth herein. Rather, these embodiments are provided so that this disclosure will be thorough and complete, and will fully convey the scope of the invention to one of ordinary skill in the art, and the scope of the invention is defined by the appended claims. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification. Embodiments will now be described more fully with reference to the accompanying drawings. Therefore, the embodiments described in the specification and configurations shown in the drawings are merely examples of the present invention and do not represent all technical concepts of the present invention, and the present invention may include all revisions, equivalents, or substitutions of the embodiments at the time of filing.

The term 'unit, or 'module', as used herein, means, but is not limited to, a hardware component or a circuit, such as a Field Programmable Gate Array (FPGA) or Application Specific Integrated Circuit (ASIC).

A video encoding apparatus and method and a video decoding apparatus and method will now be explained with reference to FIGS. 1A through 7B.

Also, a video encoding technique and a video decoding technique based on coding units having a tree structure according to an embodiment that may be applied to the video encoding method and the video decoding method will be explained with reference to FIGS. 8 through 20.

Hereinafter, an 'image' may indicate a still image of a video or a moving picture, i.e., the video itself.

Hereinafter, a 'sample' denotes data that is assigned to a sampling location of an image and is to be processed. For example, pixels in an image of a spatial domain may be samples.

Hereinafter, a 'current block' may refer to a coding unit or a prediction block of a current image to be encoded or decoded.

First, an apparatus and method for encoding a video by performing intra prediction and an apparatus and method for decoding a video by performing an intra prediction according to an embodiment will now be explained with reference to FIGS. 1A through 7B.

FIG. 1A is a block diagram of a video encoding apparatus 10 according to an embodiment.

Intra prediction refers to a prediction method using a similarity between a current block and other areas spatially adjacent to the current block. In intra prediction, a current block may be predicted by referring to neighboring reference pixels that are encoded or decoded earlier than the current block. A difference between pixel values of a current block and a prediction block predicted by using intra prediction may be represented as residual data. Accordingly, since information about an intra prediction mode and residual data, are output through intra prediction on a current block, instead of directly outputting image information of the current block, encoding/decoding efficiency may be improved.

The video encoding apparatus 10 may include a predictor 12 and an encoder 14.

The predictor 12 may generate a prediction block for a current block by performing intra prediction by using neighboring reference pixels of the current block to be encoded. The neighboring reference pixels used in the intra prediction are pixels that are located adjacent to the current block and are previously encoded.

The predictor 12 may change a distribution of pixel values of the plurality of neighboring reference pixels. The term 'pixel value' according to an embodiment may refer to a luminance value of a pixel. For example, when a color space of an image is YCbCr (where Y is a luma component and Cb and Cr are respectively blue and red-difference chroma components), a pixel value may refer to a value of a Y component. When a color space is RGB (where R is red, G is green, and B is blue), a pixel value may refer to a value obtained by dividing a sum of an R component, a G component, and a B component by 3. According to an embodiment, when a pixel value is a 8-bit value, the pixel value may be represented as a grayscale value ranging from 0 to 255. Also, when pixels having various pixel values are distributed in neighboring reference pixels, a distribution of the pixel values of the neighboring reference pixels may refer to a histogram in which the pixel values of the neighboring reference pixels are represented by the horizontal axis and the number of pixels corresponding to each pixel value is represented by the vertical axis.

The predictor 12 may generate a prediction block by performing intra prediction on the current block according to a predetermined intra prediction mode by using the neighboring reference pixels a distribution of which is changed. Examples of the intra prediction mode may include a DC mode, a planar mode, and an angular mode.

The DC mode is an intra prediction mode using a method of filling prediction samples of the prediction block with an average value of the neighboring reference pixels of the current block.

Also, the planar mode is an intra prediction mode calculated according to Equation 1 for a prediction sample predSample[x],[y] (where each of x and y ranges from 0 to nTbs−1).

$$predSamples[x][y]=((nTbS-1-x)*p[-1][y]+(x+1)*p[nTbS][-1]+(nTbS-1-y)*p[x][-1]+(y+1)*p[-1][nTbS]+nTbS)>>(\text{Log }2(nTbS)+1) \quad (1)$$

In Equation 1, nTbS denotes a horizontal or vertical length of the prediction block.

Also, the angular mode is an intra prediction mode in which a prediction value of a current pixel is determined from the neighboring reference pixels, in consideration of a direction according to a prediction angle from among prediction modes within a screen.

The neighboring reference pixels used in the intra prediction may include at least one from among pixels located in upper, upper-right, left, and lower-left corners adjacent to the current block. When the current block is an N×N block having a width and a height of N (N is a positive number), the predictor 12 may determine neighboring reference pixels including N+1 pixels located in the upper corner adjacent to the current block, N pixels located in the upper-right corner adjacent to the current block, N pixels located in the left corner adjacent to the current block, and N pixels located in the lower-left corner adjacent to the current block as the neighboring reference pixels used in the intra prediction. That is, the predictor 12 may perform the intra prediction by using N×4+1 neighboring reference pixels located in the upper, upper-right, left, and lower-left corners adjacent to the current block, and may generate the prediction block of the current block.

Figure 3:
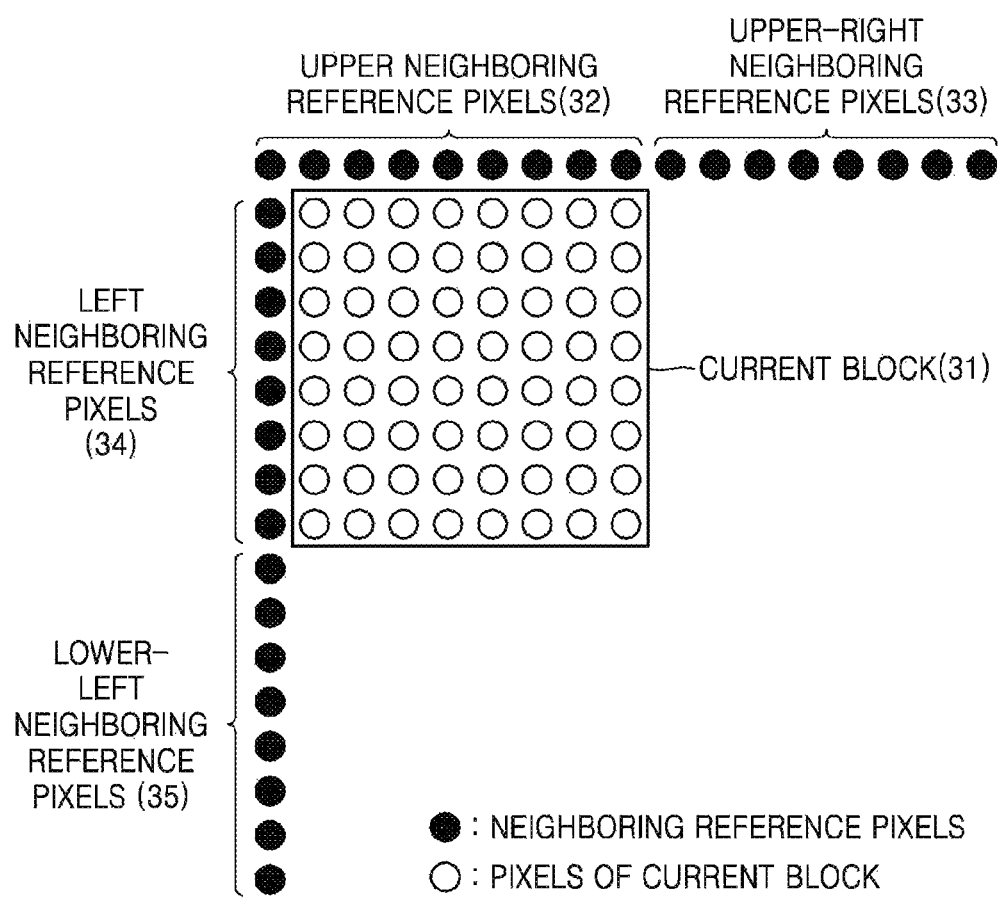
FIG. 3 illustrates pixels of a current block on which intra prediction is to be performed and neighboring reference pixels that may be used in the intra prediction.

Referring to FIG. 3, when the current block has a size of 8×8, the predictor 212 may perform intra prediction by using upper pixels 32, upper-right pixels 33, left pixels 34, and lower-left pixels 35. The neighboring reference pixels will be explained below in detail with reference to FIG. 3.

Referring back to FIG. 1A, the predictor 12 according to an embodiment may change the distribution of the pixel values of the neighboring reference pixels. The predictor 12 according to an embodiment may change an overall distribution of the pixel values of the neighboring reference pixels by separating the neighboring reference pixels into a plurality of sets and adding a predetermined offset value to pixel values of pixels included in each set, based on the pixel values of the neighboring reference pixels. The predetermined offset value may be a positive number or a negative number. When the predetermined offset value is a positive number, a pixel value of each pixel may be increased (that is, the pixel may be brighter), and when the predetermined offset value is a negative number, a pixel value of each pixel may be reduced (that is, the pixel may be darker).

For example, the predictor 12 may determine an average pixel value of the neighboring reference pixels a distribution of which is to be changed, and may divide the neighboring reference pixels into two sets. The two sets may include a first set in which pixels having pixel values less than the average pixel value are included and a second set in which pixels having pixel values greater than the average pixel value are included. The predictor 12 according to an embodiment may change the distribution by adding 'α' to the pixel values of the pixels included in the first set and adding 'β' to the pixel values of the pixels included in the second set. α and β may be positive numbers or negative numbers as described above.

The predictor 12 according to another embodiment may perform intra prediction without changing the distribution of the pixel values of the neighboring reference pixels. That is, the predictor 12 may perform intra prediction by directly using the pixel values of the neighboring reference pixels or after changing a pixel value of at least one pixel from among the neighboring reference pixels by using only a filter. When the distribution of the pixel values of the neighboring reference pixels is not changed, the predictor 12 according to an embodiment may cause a first flag to indicate that the distribution of the pixel values of the neighboring reference pixels is not changed.

The predictor 12 according to an embodiment may generate a first flag indicating information about whether the distribution of the pixel values of the neighboring reference pixels is changed. When the first flag according to an embodiment that is 1-bit data has a value of 1, the first flag may indicate that the distribution of the pixel values of the neighboring reference pixels is changed. When the first flag has a value of 0, the first flag may indicate that the distribution of the pixel values of the neighboring reference pixels is not changed.

The predictor 12 according to an embodiment may generate a second flag indicating any mode from among a plurality of modes indicating a method of changing the distribution of the pixel values of the neighboring reference pixels. When the predictor 12 according to an embodiment generates the first flag indicating that the distribution of the pixel values of the neighboring reference pixels is changed, the predictor 12 may additionally generate the second flag indicating any mode from among the plurality of modes indicating the method of changing the distribution of the pixel values of the neighboring reference pixels. The second flag according to an embodiment may indicate a method of changing the distribution described below with reference to FIGS. 4 through 6B or any of other methods.

The encoder 14 may generate a bitstream by encoding the current block. The encoder 14 according to an embodiment may generate a bitstream by encoding information indicating an intra prediction mode, and information indicating residual data between the current block and the prediction block. Also, when the predictor 12 generates the first flag indicating information about whether the distribution of the pixel values of the neighboring reference pixels is changed and the second flag indicating any mode from among the plurality of modes of changing the distribution of the pixel values of the neighboring reference pixels, the encoder 14 may generate a bitstream by encoding the first flag and the second flag. The encoded bitstream may be transmitted to a video decoding apparatus 20 that will be explained below.

Figure 1B:
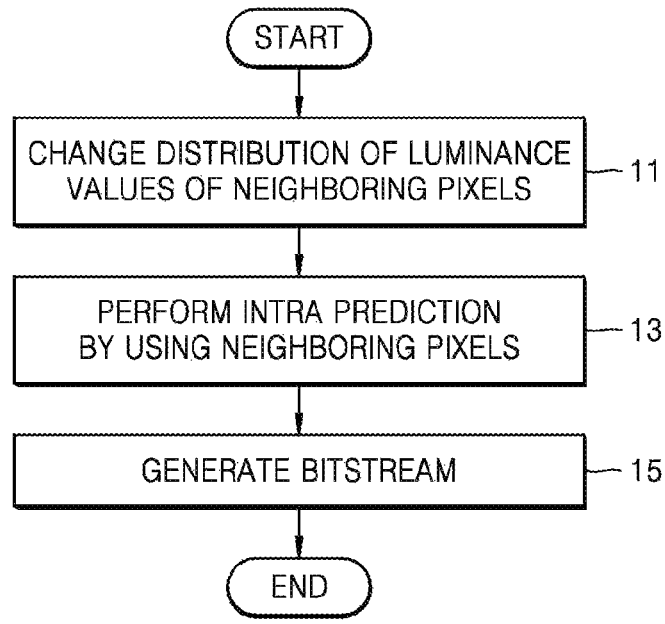
FIG. 1B is a flowchart of a video encoding method according to an embodiment.

FIG. 1B is a flowchart of a video encoding method according to an embodiment.

In operation 11, the video encoding apparatus 10 may change a distribution of pixel values of neighboring reference pixels that are previously decoded and are needed for intra prediction. The neighboring reference pixels used in the intra prediction may include at least one from among pixels located in upper, upper-right, left, and lower-left corners adjacent to a current block. When the current block is an N×N block having a width and a height of N (N is a positive number), the neighboring reference pixels may include N+1 pixels located in the upper corner adjacent to the current block, N pixels located in the upper-right corner adjacent to the current block, N pixels located in the left corner adjacent to the current block, and N pixels located in the lower-left corner adjacent to the current block.

In operation 11, the video encoding apparatus 10 according to an embodiment may change the distribution of the pixel values of the neighboring reference pixels by dividing the neighboring reference pixels into a plurality of sets and adding a predetermined offset value to pixel values of pixels included in each set. The predetermined offset value may be a positive number or a negative number. When the predetermined offset value is a positive number, a pixel value of each pixel may be increased (that is, the pixel may be brighter), and when the predetermined offset value is a negative number, a pixel value of each pixel may be reduced (that is, the pixel may be darker). For example, the video encoding apparatus 10 according to an embodiment may determine an average pixel value of the neighboring reference pixels a distribution of which is to be changed, and may divide the neighboring reference pixels into two sets. The two sets may include a first set in which pixels having pixel values less than the average pixel value are included and a second set in which pixels having pixel values greater than the average pixel value are included. The video encoding apparatus 10 may change the distribution by adding 'α' to the pixel values of the pixels included in the first set and adding 'β' to the pixel values of the pixels included in the second set.

In operation 11, the video encoding apparatus 10 according to an embodiment may generate a first flag indicating information about whether the distribution of the pixel values of the neighboring reference pixels is changed. When the first flag according to an embodiment that is 1-bit data has a value of 1, the first flag may indicate that the distribution of the pixel values of the neighboring reference pixels is changed. When the first flag has a value of 0, the first flag may indicate that the distribution of the pixel values of the neighboring reference pixels is not changed. The video encoding apparatus 10 according to an embodiment may generate a second flag indicating any mode from among a plurality of modes indicating a method of changing the distribution of the pixel values of the neighboring reference pixels. When the video encoding apparatus 10 according to an embodiment generates the first flag indicating that the distribution of the pixel values of the neighboring reference pixels is changed, the video encoding apparatus 10 may additionally generate the second flag indicating any mode from among the plurality of modes indicating the method of changing the distribution of the pixel values of the neighboring reference pixels. The second flag according to an embodiment may indicate a method of changing the distribution described below with reference to FIGS. 4 through 6B or any of other methods.

In operation 13, the video encoding apparatus 10 may perform intra prediction on the current block by using the neighboring reference pixels. Since a prediction block generated by using the neighboring reference pixels whose pixel value distribution is changed has a higher similarity to the current block than a prediction block generated by using neighboring reference pixels whose pixel value distribution is not changed, encoding/decoding efficiency may be improved. The video encoding apparatus 10 may generate the prediction block by determining an intra prediction mode and determining prediction values of pixels in the current block.

In operation 15, the video encoding apparatus 10 may generate a bitstream of an encoded video. The video encoding apparatus 10 according to an embodiment may generate a bitstream by encoding information indicating the intra prediction mode and information indicating residual data between the current block and the prediction block. Also, when the first flag indicating whether the distribution of the pixel values of the neighboring reference pixels is changed and the second flag indicating any mode from among the plurality of modes indicating the method of changing the distribution of the pixel values of the neighboring reference pixels are generated in operation 11, the video encoding apparatus 10 may generate a bitstream by encoding the first flag and the second flag.

Figure 2A:
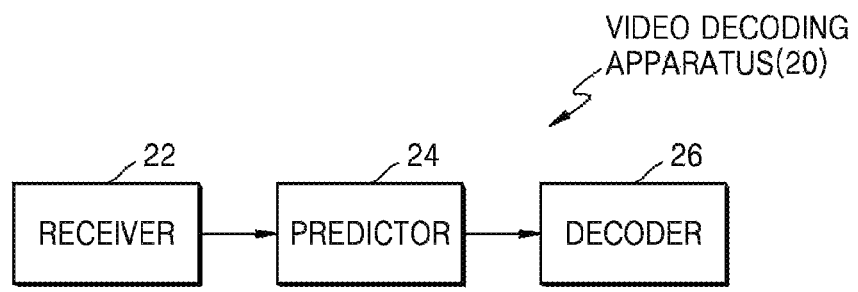
FIG. 2A is a block diagram of a video decoding apparatus according to an embodiment.

FIG. 2A is a block diagram of the video decoding apparatus 20 according to an embodiment.

The video decoding apparatus 20 may include a receiver 22, a predictor 24, and a decoder 26.

The receiver 22 may receive a bitstream of an encoded video. The receiver 22 according to an embodiment may receive intra prediction mode information for decoding a current block from the bitstream.

The receiver 22 according to an embodiment may receive a first flag indicating information about whether a distribution of pixel values of neighboring reference pixels is changed, from the bitstream. Also, the receiver 22 according to an embodiment may receive a second flag indicating any mode from among a plurality of modes indicating a method of changing the distribution of the pixel values of the neighboring reference pixels. The receiver 22 according to an embodiment may additionally receive the second flag only when the first flag indicates that the distribution of the pixel values of the neighboring reference pixels is changed. When the first flag according to an embodiment that is 1-bit data has a value of 1, the first flag may indicate that the distribution of the pixel values of the neighboring reference pixels is changed. When the first flag has a value of 0, the first flag may indicate that the distribution of the pixel values of the neighboring reference pixels is not changed. The second flag according to an embodiment may indicate a method of changing the distribution described below with reference to FIGS. 4 through 6B or any of other methods.

The predictor 24 may change the distribution of the pixels values of the neighboring reference pixels that are previously decoded, and may perform intra prediction by using the neighboring reference pixels the distribution of which is changed.

The neighboring reference pixels used in the intra prediction may include at least one from among pixels located in upper, upper-right, left, and lower-left corners adjacent to the current block. When the current block is an N×N block having a width and a height of N (N is a positive number), the predictor 24 may determine neighboring reference pixels including N+1 pixels located in the upper corner adjacent to the current block, N pixels located in the upper-right corner adjacent to the current block, N pixels located in the left corner adjacent to the current block, and N pixels located in the lower-left corner adjacent to the current block as the neighboring reference pixels used in the intra prediction. That is, the predictor 24 may perform the intra prediction by using N×4+1 neighboring reference pixels located in the upper, upper-right, left, and lower-left corners adjacent to the current block, and may generate a prediction block of the current block.

The predictor 24 according to an embodiment may change an overall distribution of the pixel values of the neighboring reference pixels by separating the neighboring reference pixels into a plurality of sets and adding a predetermined offset value to pixel values of pixels included in each set, based on the pixel values of the neighboring reference pixels. The predetermined offset value may be a positive number or a negative number. When the predetermined offset value is a positive number, a pixel value of each pixel may be increased (that is, the pixel may be brighter), and when the predetermined offset value is a negative number, a pixel value of each pixel may be reduced (that is, the pixel may be darker).

For example, the predictor 24 may determine an average pixel value of the neighboring reference pixels a distribution of which is to be changed, and may divide the neighboring reference pixels into two sets. The two sets may include a first set in which pixels having pixel values less than the average pixel value are included and a second set in which pixels having pixel values greater than the average pixel value are included. The predictor 24 according to an embodiment may change the distribution by adding 'α' to the pixel values of the pixels included in the first set and adding 'β' to the pixel values of the pixels included in the second set. α and β may be positive numbers or negative numbers as described above. The predictor 24 according to an embodiment may differently determine a method of changing the distribution according to the received second flag.

The predictor 24 according to an embodiment may generate the prediction block by determining prediction values of pixels in the current block according to the received intra prediction mode, based on the neighboring reference pixels.

The predictor 24 according to another embodiment may perform intra prediction based on the neighboring reference pixels the distribution of which is not changed. That is, the predictor 24 may perform intra prediction by directly using the pixel values of the neighboring reference pixels or after changing a pixel value of at least one pixel from among the neighboring reference pixels by using only a filter, when the first flag indicates that the distribution of the pixel values of the neighboring reference pixels is not changed, based on the first flag received by the receiver 22.

The decoder 26 may reconstruct the current block by using received residual data and the generated prediction block.

Figure 2B:
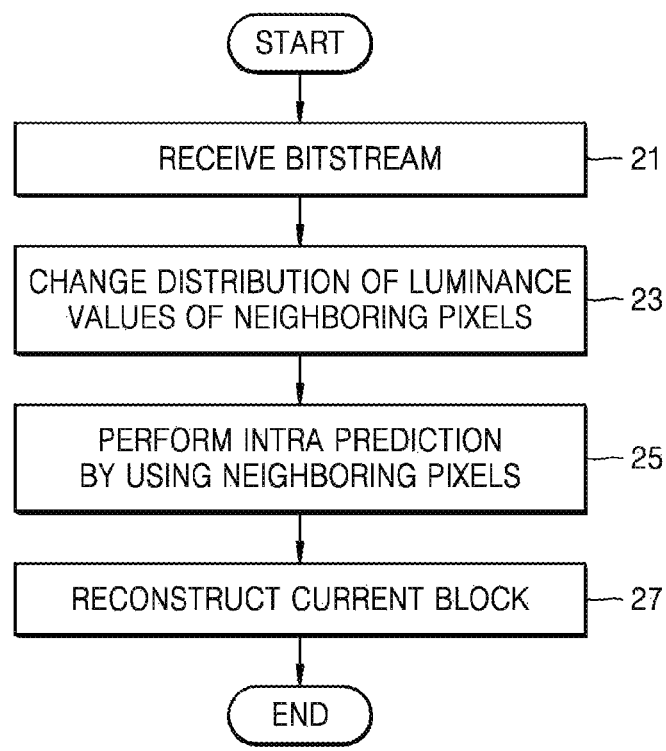
FIG. 2B is a flowchart of a video decoding method according to an embodiment.

FIG. 2B is a flowchart of a video decoding method according to an embodiment.

In operation 21, the video decoding apparatus 20 may receive a bitstream of an encoded video. The received bitstream may include information about an intra prediction mode of a current block and residual data information. The video decoding apparatus 20 according to an embodiment may obtain a first flag indicating information about whether a distribution of pixel values of neighboring reference pixels is changed from the bitstream. Also, the video decoding apparatus 20 according to an embodiment may obtain a second flag indicating any mode from among a plurality of modes of changing the distribution of the pixel values of the neighboring reference pixels. The video decoding apparatus 20 according to an embodiment may additionally receive the second flag only when the first flag indicates that the distribution of the pixel values of the neighboring reference pixels is changed.

In operation 23, the video decoding apparatus 20 may change the distribution of the pixel values of the neighboring reference pixels of the current block. The neighboring reference pixels used in intra prediction may include at least one from among pixels located in upper, upper-right, left, and lower-left corners adjacent to the current block. When the current block is an N×N block having a width and a height of N (N is a positive number), the video decoding apparatus 20 may use the neighboring reference pixels including N+1 pixels located in the upper corner adjacent to the current block, N pixels located in the upper-right corner adjacent to the current block, N pixels located in the left corner adjacent to the current block, and N pixels located in the lower-left corner adjacent to the current block in the intra prediction. That is, the video decoding apparatus 20 may perform the intra prediction by using N×4+1 neighboring reference pixels located in the upper, upper-right, left, and lower-left corners adjacent to the current block, and may generate a prediction block of the current block.

In operation 23, the video decoding apparatus 20 may determine mode information about a mode of changing the distribution of the pixel values of the neighboring reference pixels based on the second flag obtained in operation 21, and may change the distribution of the pixel values of the neighboring reference pixels according to the mode information. For example, the video decoding apparatus 20 according to an embodiment may change an overall distribution of the pixel values of the neighboring reference pixels by separating the neighboring reference pixels into a plurality of sets and adding a predetermined offset value to pixel values of pixels included in each set, based on the pixel values of the neighboring reference pixels. The predetermined offset value may be a positive number or a negative number. When the predetermined offset value is a positive number, a pixel value of each pixel may be increased (that is, the pixel may be brighter), and when the predetermined offset value is a negative number, a pixel value of each pixel may be reduced (that is, the pixel may be darker). For example, the video decoding apparatus 20 may determine an average pixel value of the neighboring reference pixels a distribution of which is to be changed, and may divide the neighboring reference pixels into two sets. The two sets may include a first set in which pixels having pixel values less than the average pixel value are included and a second set in which pixels having pixel values greater than the average pixel value are included. The video decoding apparatus 20 according to an embodiment may change the distribution by adding 'α' to the pixel values of the pixels included in the first set and adding 'β' to the pixel values of the pixels included in the second set. α and β may be positive numbers or negative numbers as described above.

In operation 25, the video decoding apparatus 20 may perform intra prediction on the current block, by using the neighboring reference pixels the distribution of which is changed in operation 23. The video decoding apparatus 20 according to an embodiment may generate the prediction block by determining prediction values of pixels in the current block according to the intra prediction mode obtained in operation 21 by using the neighboring reference pixels.

In operation 27, the video decoding apparatus 20 may reconstruct the current block. The video decoding apparatus 20 according to an embodiment may reconstruct the current block by using the residual data information received in operation 21 and the prediction block generated in operation 25.

FIG. 3 illustrates neighboring reference pixels that may be used in intra prediction according to an embodiment.

The video encoding apparatus 10 and the video decoding apparatus 20 may use neighboring reference pixels, in order to perform intra prediction.

When a current block 31 on which intra prediction is to be performed has a size of 8×8, neighboring reference pixels of the current block 31 used in the intra prediction may include 9 upper neighboring reference pixels 32, 8 upper-right neighboring reference pixels 33, 8 left neighboring reference pixels 34, and 8 lower-left neighboring reference pixels 35. That is, the video decoding apparatus 20 may perform the intra prediction by using 33 neighboring reference pixels including the 9 upper neighboring reference pixels 32, the 8 upper-right neighboring reference pixels 33, the 8 left neighboring reference pixels 34, and the 8 lower-left neighboring reference pixels 35. Although the video decoding apparatus 20 uses only the upper neighboring reference pixels 32, the upper-right neighboring reference pixels 33, the left neighboring reference pixels 34, and the lower-left neighboring reference pixels 35 as pixels used to perform the intra prediction on the current block 31 for convenience of explanation, embodiments are not limited thereto and the video decoding apparatus 20 may use pixels other than the upper neighboring reference pixels 32, the upper-right neighboring reference pixels 33, the left neighboring reference pixels 34, and the lower-left neighboring reference pixels 35 in the intra prediction.

The video decoding apparatus 20 may change a distribution of pixel values of the neighboring reference pixels 32, 33, 34, and 35 as described above. For example, the video decoding apparatus 20 may divide the 33 neighboring reference pixels stored in one one-dimensional (1D) array into a plurality of sets based on pixel values and may change the distribution by adjusting pixel values of pixels included in each set.

The video decoding apparatus 20 according to an embodiment may change a distribution of pixel values of only some pixels from among the neighboring reference pixels 32, 33, 34, and 35. For example, the video decoding apparatus 20 may change a distribution of pixel values of only 17 pixels including the 9 upper neighboring reference pixels 32 and the 8 left neighboring reference pixels 34.

Methods by which the video encoding apparatus 10 and the video decoding apparatus 20 change a distribution of pixel values of neighboring reference pixels that may be used in intra prediction will now be explained with reference to FIGS. 4 through 6B.

Figure 4:
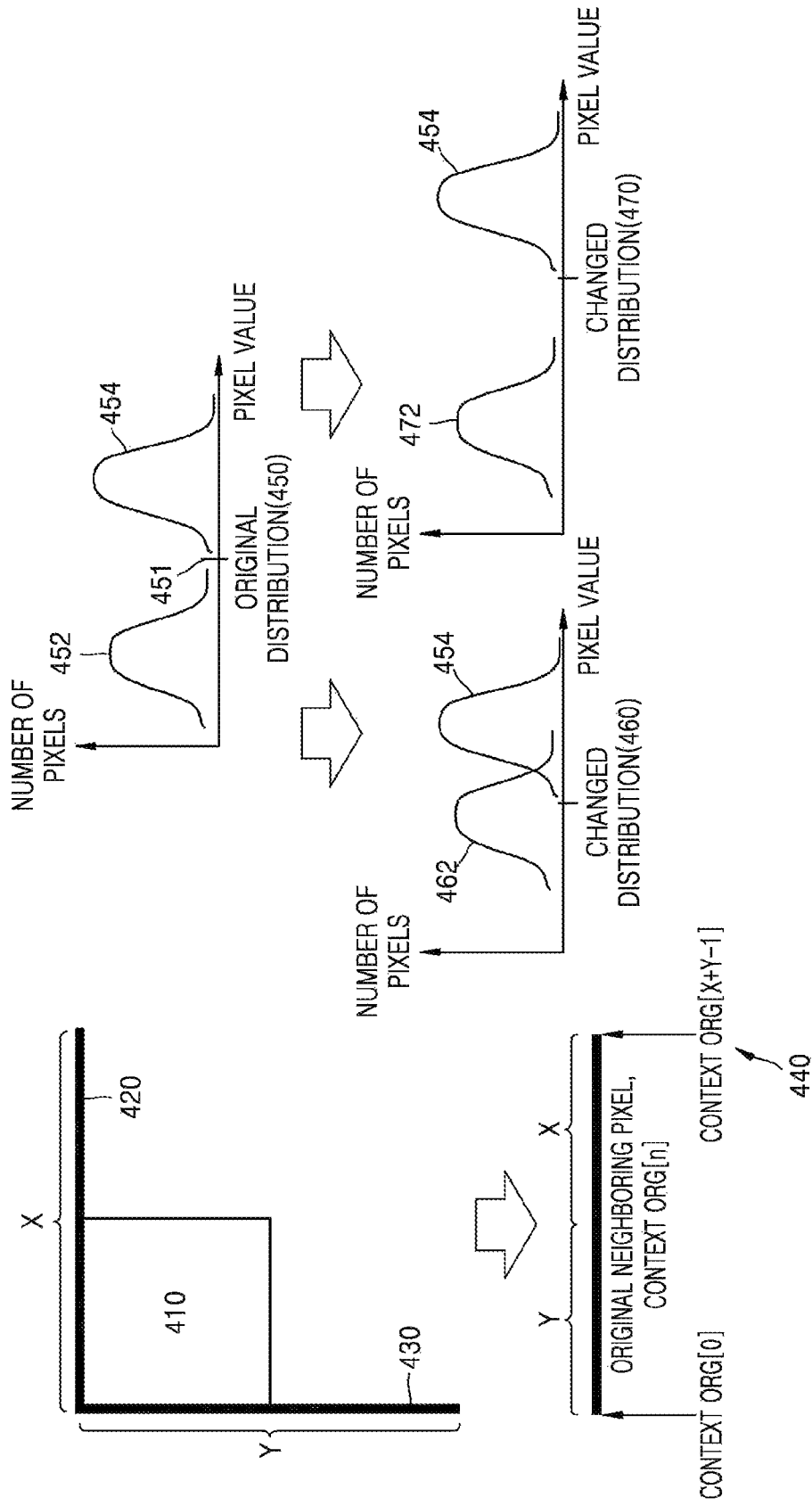
FIG. 4 illustrates a method of changing a distribution of pixel values of neighboring reference pixels that may be used in intra prediction and pixels of a current block, according to an embodiment.

FIG. 4 illustrates a method of changing a distribution of pixel values of neighboring reference pixels that may be used in intra prediction according to an embodiment.

The video decoding apparatus 20 according to an embodiment may store neighboring reference pixels 420 and 430 of a current block 410 in a 1D array Context Org[X+Y+1] 440.

An original distribution 450 that is a distribution of pixel values of initial neighboring reference pixels before a distribution is changed is a histogram in which pixel values of pixels stored in the 1D array Context Org[X+Y+1] 440 is represented by the horizontal axis and the number of pixels is represented by the vertical axis. For example, the original distribution 450 of the pixel values of the pixels stored in the 1D array Context Org[X+Y+1] 440 may be a mixture Gaussian distribution in which two Gaussian distributions 452 and 454 exist. The Gaussian distribution 452 may include pixels having pixel values less than a reference value 451, and the Gaussian distribution 454 may include pixels having pixel values greater than the reference value 451.

The video decoding apparatus 20 according to an embodiment may add a predetermined offset value to the pixel values of all of the pixels included in the Gaussian distribution 452 without changing the Gaussian distribution 454. In this case, the Gaussian distribution 452 is shifted rightward to become a Gaussian distribution 462, and the original distribution 450 becomes a changed distribution 460. For example, the Gaussian distribution 452 that is a distribution $G(m, \sigma^2)$ with an average m and a variance $\sigma^2$ may be changed by an offset value α to become the Gaussian distribution 462 that is a distribution $G(m-\alpha, \sigma^2)$ (α is a positive real number).

The video decoding apparatus 20 according to an embodiment may add a negative offset value to the pixel values of all of the pixels included in the Gaussian distribution 452 without changing the Gaussian distribution 454. In this case, the Gaussian distribution 452 is shifted leftward to become a Gaussian distribution 472, and the original distribution 450 becomes a changed distribution 470. For example, the Gaussian distribution 452 that is a distribution $G(m, \sigma^2)$ with an average m and a variance $\sigma^2$ may be changed by an offset value β to become the Gaussian distribution 472 that is a distribution $G(m-\beta, \sigma^2)$ (β is a negative real number).

Although not shown in FIG. 4, the video decoding apparatus 20 according to an embodiment may also shift the Gaussian distribution 454 leftward or rightward by adding a predetermined offset value to the pixel values of all of the pixels included in the Gaussian distribution 454, instead of the Gaussian distribution 452.

Although it is assumed for convenience of explanation that the original distribution 450 of the neighboring reference pixels is a mixture of two Gaussian distributions, the neighboring reference pixels may have any of various other distributions, and the distribution of the neighboring reference pixels may be changed by dividing the neighboring reference pixels into a plurality of sets by using any method.

Figure 5:
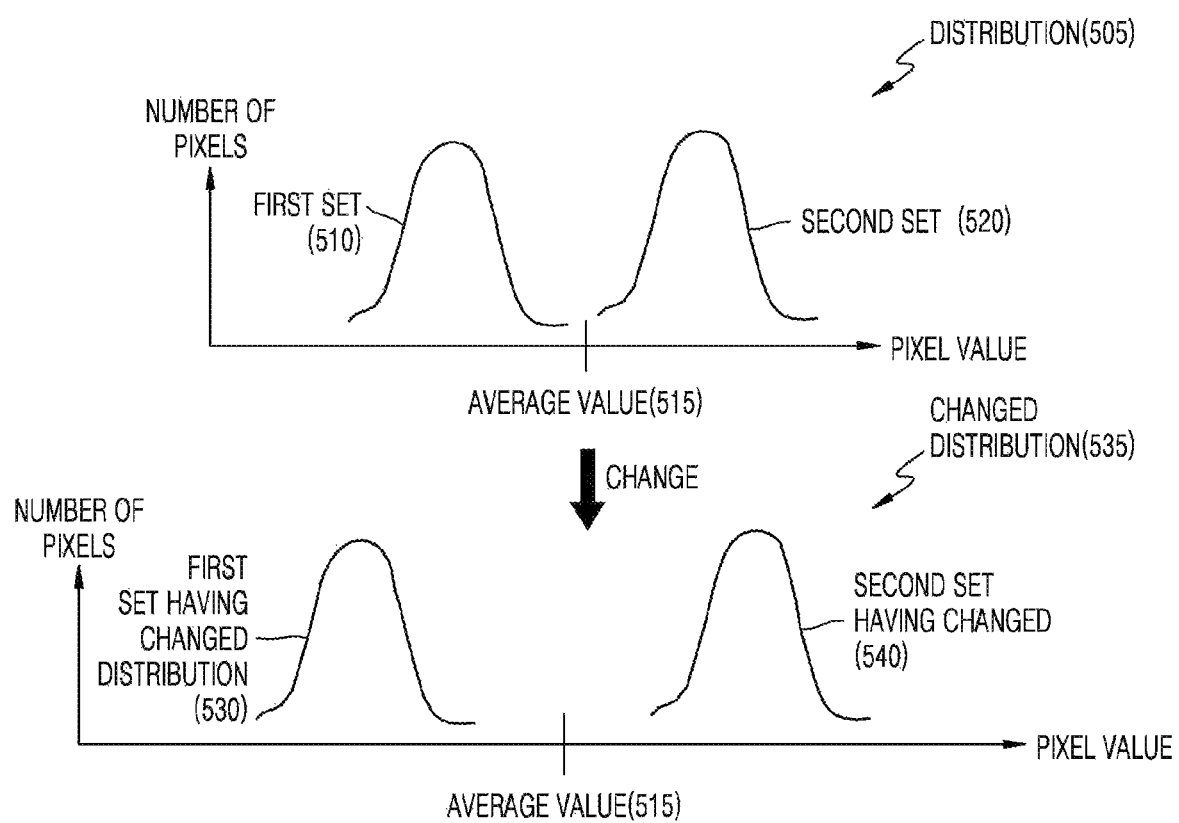
FIG. 5 illustrates a method of changing a distribution of pixel values of neighboring reference pixels that may be used in intra prediction and pixels of a current block, according to an embodiment.

FIG. 5 illustrates a method of changing a distribution of pixel values of neighboring reference pixels that may be used in intra prediction and pixels of a current block according to an embodiment.

A distribution 505 is a histogram showing pixel values of neighboring reference pixels needed to perform intra prediction on a current block.

The video decoding apparatus 20 according to an embodiment may determine an average value 515 of pixel values of the neighboring reference pixels a distribution of which is to be changed. The video decoding apparatus 20 may divide the neighboring reference pixels into a first set 510 in which pixels having pixel values less than the average value 515 are included and a second set 520 in which pixels having pixel values greater than the average value 515 are included.

The video decoding apparatus 20 according to an embodiment may change the distribution 505 by reducing the pixel values of the pixels included in the first set 510 by 3 and increasing the pixel values of the pixels included in the second set 520 by 4. A changed distribution 535 may include a first set 530 a distribution of which is changed and a second set 540 a distribution of which is changed.

For example, when the first set 510 is a Gaussian distribution $G2(m_2, \sigma_2^2)$ with an average $m_1$ and a variance $\sigma_1^2$ and the second set 520 is a Gaussian distribution $G2(m_2, \sigma_2^2)$ with an average $m_2$ and a variance $\sigma_2^2$, the first set 530 the distribution of which is changed may become a Gaussian distribution $G1(m_1+3, \sigma_1^2)$, and the second set 540 the distribution of which is changed may become a Gaussian distribution $G2(m_2-4, \sigma_2^2)$.

Figure 6A:
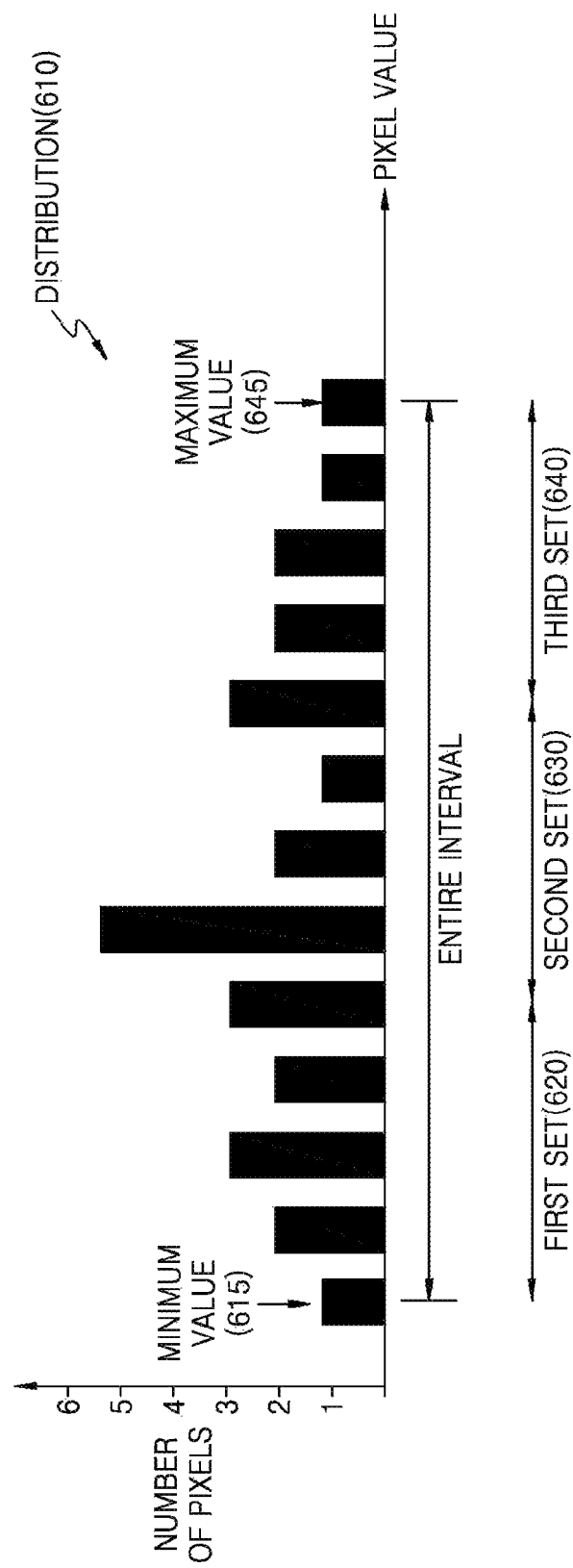
FIG. 6A illustrates a method of changing a distribution of pixel values of neighboring reference pixels that may be used in intra prediction and pixels of a current block, according to an embodiment.

FIG. 6A illustrates a method of changing a distribution of pixel values of neighboring reference pixels that may be used in intra prediction according to another embodiment.

A distribution 610 is a histogram showing pixel values of neighboring reference pixels, in which pixel values of 29 neighboring reference pixels are represented by the horizontal axis and the number of pixels for each pixel value is represented by the vertical axis.

The video decoding apparatus 20 according to an embodiment may equally divide an interval between a minimum luminance value 615 and a maximum luminance value 645 into N (N is an integer) sub-intervals and may group pixels included in each sub-interval into one set.

The video decoding apparatus 20 according to an embodiment may change the distribution 610 by adding the same offset value to each set. For example, the video decoding apparatus 20 may change the distribution by adding α to pixel values of pixels included in a first set 620, adding β to pixel values of pixels included in a second set 630, and adding γ to pixel values of pixels included in a third set 640. α, β, and γ may be positive numbers or negative numbers.

Figure 6B:
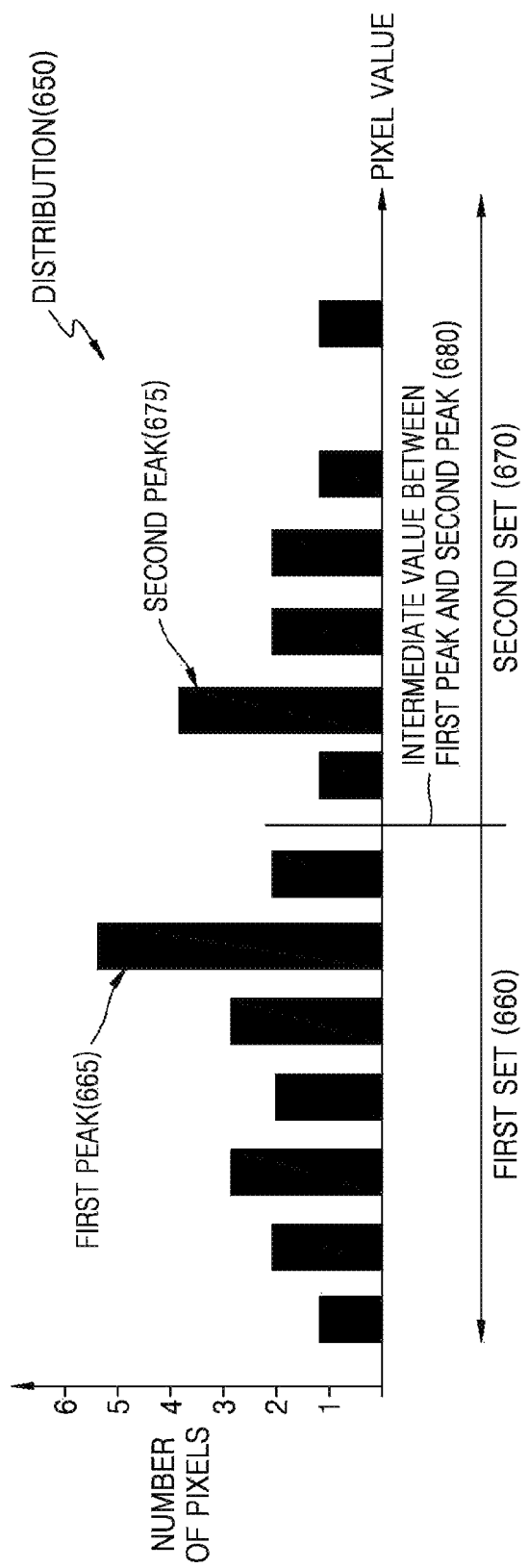
FIG. 6B illustrates a method of changing a distribution of pixel values of neighboring reference pixels that may be used in intra prediction and pixels of a current block, according to an embodiment.

FIG. 6B illustrates a method of changing a distribution of pixel values of neighboring reference pixels that may be used in intra prediction according to another embodiment.

A distribution 650 is a histogram showing pixel values of neighboring reference pixels, in which pixel values of 30 neighboring reference pixels are represented by the horizontal axis and the number of pixels for each pixel value is represented by the vertical axis. A first peak 665 indicates a pixel value at which the number of pixels is the largest (=6) in the distribution 650, and a second peak 675 indicates a pixel value at which the number of pixels is the second largest (=4) after the first peak 665.

The video decoding apparatus 20 according to an embodiment may divide the neighboring reference pixels into a plurality of sets based on an intermediate value 680 between the first peak 665 and the second peak 675. For example, the video decoding apparatus 20 may divide the neighboring reference pixels into a first set 660 in which pixels having pixel values less than the intermediate value 680 are included and a second set 670 in which pixels having pixel values greater than the intermediate value 680 are included. The video decoding apparatus 20 may change the distribution 650 by adding α to the pixel values of the pixels included in the first set 660 and adding β to the pixel values of the pixels included in the second set 670.

Figure 7A:
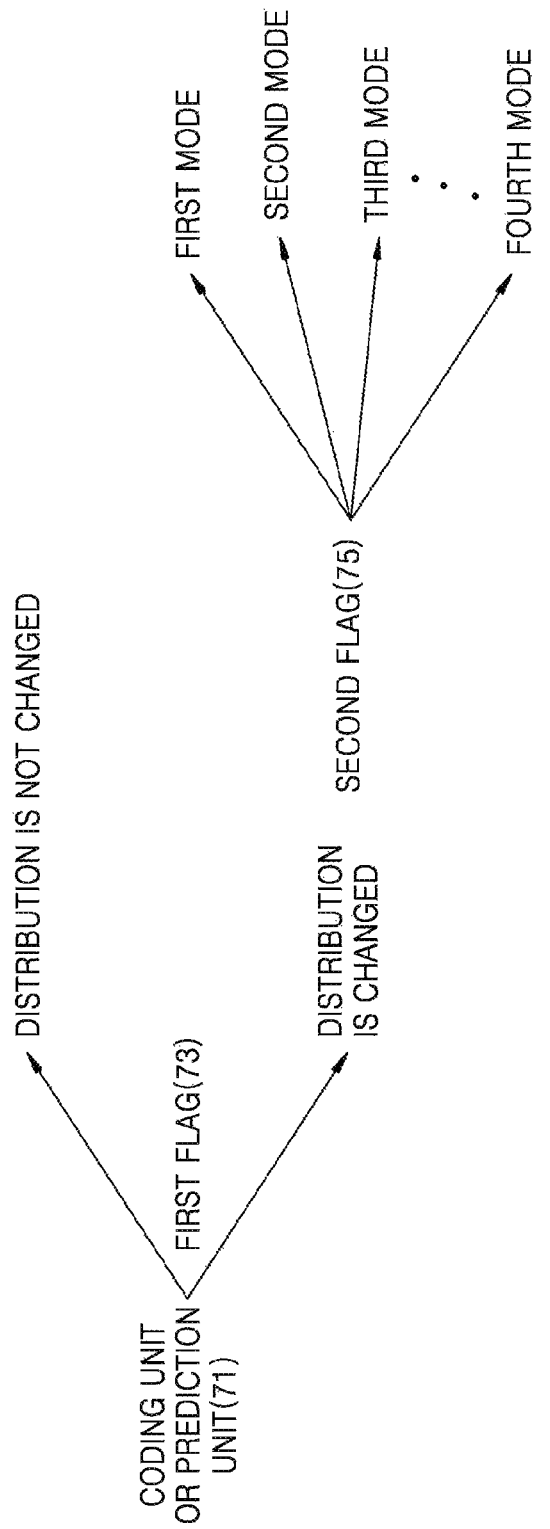
FIG. 7A illustrates a flag indicating information needed to change a distribution of neighboring reference pixels, according to an embodiment.

FIG. 7A illustrates a flag indicating information needed to change a distribution of neighboring reference pixels according to an embodiment.

The video encoding apparatus 10 according to an embodiment may generate a first flag 73 indicating whether a distribution of pixel values of neighboring reference pixels is changed and a second flag 75 indicating any mode from among a plurality of modes indicating a method of changing the distribution of the pixel values of the neighboring reference pixels as described above. The first flag 73 according to an embodiment may be 1-bit data and the second flag 75 may be n-bit data.

The video encoding apparatus 10 may generate the first flag 73 according to each coding unit or a prediction unit 71.

The video encoding apparatus 10 according to an embodiment may generate the first flag 73 according to each coding unit. In this case, a distribution of pixel values of neighboring reference pixels may be changed for all prediction units existing in one coding unit, and the first flag 73 for a current coding unit may indicate that the distribution of the pixel values of the neighboring reference pixels is changed. When the video decoding apparatus 20 according to an embodiment obtains the first flag 73 according to each coding unit and the first flag 73 for the current coding unit indicates that the distribution of the pixel values of the neighboring reference pixels is changed, intra prediction may be performed by changing the distribution of the pixel values of the neighboring reference pixels for all prediction units existing in the current coding unit.

The video encoding apparatus 10 according to an embodiment may generate the first flag 73 according to each prediction unit. In this case, a distribution of pixel values of neighboring reference pixels may be changed for a current prediction unit, and the first flag 73 for the current prediction unit may indicate that the distribution of the pixel values of the neighboring reference pixels is changed. When the video decoding apparatus 20 according to an embodiment obtains the first flag 73 according to each prediction unit and the first flag 73 for the current prediction unit indicates that the distribution of the pixel values of the neighboring reference pixels is changed, intra prediction may be performed by changing the distribution of the pixel values of the neighboring reference pixels for the current prediction unit.

The second flag 75 may specify a method of changing the distribution of the pixel values of the pixels. For example, the second flag 75 may indicate any mode from among a first mode described with reference to FIG. 5, a second mode described with reference to FIG. 6A, and a third mode described with reference to FIG. 6B. When the second flag 75 obtained from a bitstream indicates the first mode, the video decoding apparatus 20 according to an embodiment may change the distribution of the neighboring reference pixels by using a method described with reference to FIG. 5 and may perform intra prediction.

The video encoding apparatus 10 according to an embodiment may generate the first flag 73 and the second flag 75 according to each transformation unit, and the video decoding apparatus 20 may obtain the first flag 73 and the second flag 75 according to each transformation unit.

Figure 7B:
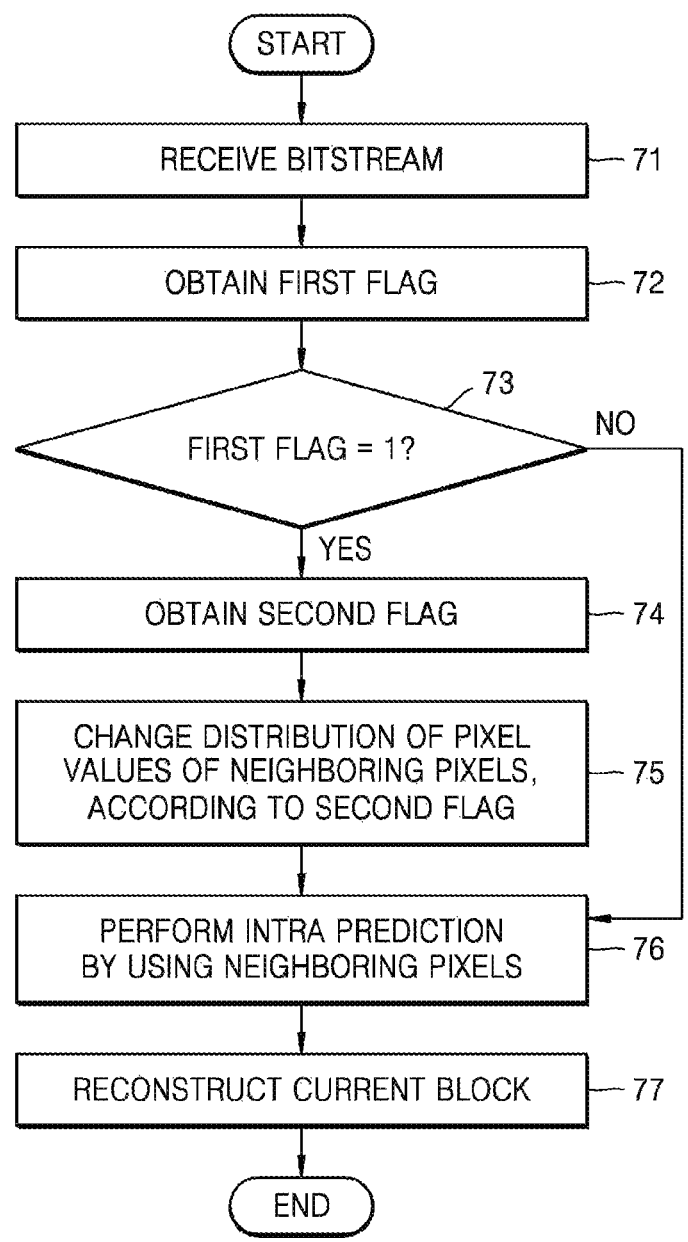
FIG. 7B is a flowchart of a method by which the video decoding apparatus differently determines a method of performing intra prediction according to a first flag and a second flag, according to an embodiment.

FIG. 7B is a flowchart of a method by which the video decoding apparatus 20 differently determines a method of performing intra prediction according to a first flag and a second flag according to an embodiment.

Operations 71, 76, and 77 are respectively the same as operations 21, 25, and 27, and thus an explanation thereof will not be given.

In operation 72, the video decoding apparatus 20 according to an embodiment may obtain a first flag indicating whether a distribution of pixel values of neighboring reference pixels is changed from an encoded bitstream.

In operation 73, the video decoding apparatus 20 according to an embodiment may determine whether the distribution of the pixel values of the neighboring reference pixels is changed to perform intra prediction on a current block, based on the first flag. For example, the first flag may be a 1-bit flag having a value of 0 or 1. When the first flag has a value of 1, the method proceeds to operation 73, and when the first flag has a value of 0, the method proceeds to operation 75. When the first flag has a value of 0, the video decoding apparatus 20 according to an embodiment proceeds to operation 76. In operation 76, the video decoding apparatus 20 may directly perform intra prediction without changing the distribution of the pixel values of the neighboring reference pixels, or may perform intra prediction by changing the pixel values by applying only a filter to the neighboring reference pixels.

In operation 74, the video decoding apparatus 20 according to an embodiment may obtain a second flag indicating any mode from among a plurality of modes indicating a method of changing the distribution of the pixel values of the neighboring reference pixels. For example, the second flag may be an n-bit flag that specifies a method of dividing the neighboring reference pixels into a plurality of sets and includes information about an offset value for changing the pixel values.

In operation 75, the video decoding apparatus 20 according to an embodiment may change the distribution of the pixel values of the neighboring reference pixels according to the second flag. For example, the video decoding apparatus 20 may divide the neighboring reference pixels into two sets based on an average luminance value of the neighboring reference pixels, and may change the distribution by respectively adding offset values α and β to pixel values of pixels included in the two sets.

In operation 76, the video decoding apparatus 20 according to an embodiment may perform intra prediction by referring to the neighboring reference pixels. The video decoding apparatus 20 according to an embodiment may perform intra prediction on the current block by using an intra prediction mode obtained from the bitstream by using the neighboring reference pixels, and may generate a prediction block for the current block.

In operation 77, the video decoding apparatus 20 according to an embodiment may reconstruct the current block by using residual data obtained from the bitstream and the prediction block generated in operation 76.

Although only an operation of the video encoding apparatus 10 is described by omitting an operation of the video decoding apparatus 20, or only an operation of the video decoding apparatus 20 is described by omitting an operation of the video encoding apparatus 10 in FIGS. 3 through 7B for convenience of explanation, it will be understood by one of ordinary skill in the art that the video encoding apparatus 10 and the video decoding apparatus 20 may respectively perform operations corresponding to the video decoding apparatus 20 and the video encoding apparatus 10.

The video encoding apparatus 10 and the video decoding apparatus 20 according to an embodiment may split an image into largest coding units, and may perform encoding/decoding based on coding units having a tree structure for every largest coding unit. For example, the video decoding apparatus 20 may determine a size of a largest coding unit, may split an image into a plurality of maximum coding units, and may determine a current block based on split information. Also, the video decoding apparatus 20 may receive a first flag indicating whether a distribution of pixel values of neighboring reference pixels is changed and a second flag indicating any mode from among a plurality of modes of changing the distribution of the pixel values of the neighboring reference pixels according to each coding unit or prediction unit as described above.

A video encoding method and apparatus, and a video decoding method and apparatus based on coding units and transformation units having a tree structure according to an embodiment will now be described with reference to FIGS. 8 through 20.

Figure 8:
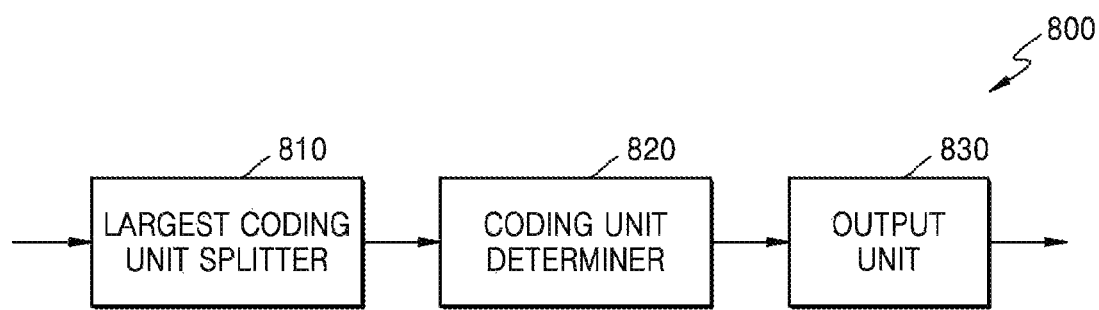
FIG. 8 is a block diagram of a video encoding apparatus 800 based on coding units having a tree structure according to an embodiment of the present invention.

FIG. 8 is a block diagram of a video encoding apparatus 800 based on coding units according to a tree structure according to an embodiment of the present invention.

An operation of the video encoding apparatus 10 described with reference to FIGS. 1A through 7B may be performed by the video encoding apparatus 800. That is, the video encoding apparatus 800 may determine a current block by hierarchically splitting an image based on a tree structure, and may perform intra prediction by changing a distribution of neighboring reference pixels of the current block.

For example, an operation of the predictor 12 of the video encoding apparatus 10 may be performed by a largest coding unit splitter 810 and a coding unit determiner 820 of the video encoding apparatus 800. Also, an operation of the encoder 14 of the video encoding apparatus 10 may be performed by an output unit 830 of the video encoding apparatus 800.

The video encoding apparatus 800 involving video prediction based on coding units having a tree structure according to an embodiment includes the largest coding unit splitter 810, the coding unit determiner 820, and the output unit 830. Hereinafter, for convenience of description, the video encoding apparatus 800 involving video prediction based on coding units having a tree structure is referred to as the 'video encoding apparatus 800'.

The largest coding unit splitter 810 may divide a current picture based on a largest coding unit that is a coding unit having a maximum size for the current picture of an image. If the current picture is larger than the largest coding unit, image data of the current picture may be split into at least one largest coding unit. The largest coding unit according to an embodiment may be a data unit having a size of 32×32, 64×64, 128×128, 256×256, etc., wherein a shape of the data unit is a square having a width and length in powers of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. That is, the coding unit determiner 820 determines a final depth by encoding the image data in the deeper coding units according to depths according to the largest coding unit of the current picture, and selecting a depth having the minimum encoding error. The determined final depth and image data according to largest coding units are output to the output unit 830.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to the embodiment may determine coding units having a tree structure included in the current largest coding unit. The 'coding units having a tree structure' according to an embodiment include coding units corresponding to a depth determined to be the final depth, from among all deeper coding units included in the current largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary shapes, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 820 not only determines a depth having a minimum encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and split information according to depths.

The encoded image data may correspond to a result obtained by encoding residual data of an image.

The split information according to depths may include depth information, partition mode information of the prediction unit, prediction mode information, and the split information of the transformation unit.

Final-depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 830 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the prediction mode information and the partition size information. The encoding information transmitted according to the prediction units may include information about an estimation direction of an inter mode, information about a reference image index of the inter mode, information about a motion vector, information about a chroma component of an intra mode, information about an interpolation method of the intra mode, information about an intra prediction mode, and information about changing of a distribution of reference pixels needed for intra prediction.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest embodiment for the video encoding apparatus 800, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

Figure 9:
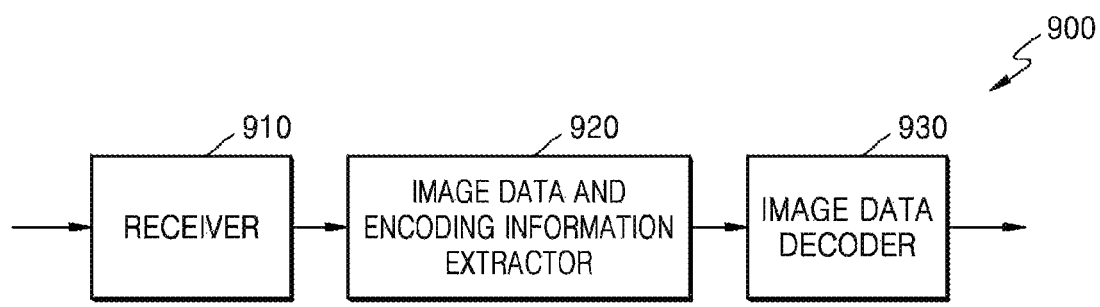
FIG. 9 is a block diagram of a video decoding apparatus 900 based on coding units having a tree structure according to an embodiment.

FIG. 9 is a block diagram of a video decoding apparatus 900 based on coding units having a tree structure according to an embodiment.

An operation of the video decoding apparatus 20 described with reference to FIGS. 2A through 7B may be performed by the video decoding apparatus 900. That is, the video decoding apparatus 900 may determine a current block by hierarchically splitting an image to be decoded based on a tree structure, and may perform intra prediction by changing a distribution of neighboring reference pixels of the current block.

For example, a receiver 910 and an image data and encoding information extractor 920 of the video decoding apparatus 900 may perform an operation of the receiver 22 of the video decoding apparatus 20, and an image data decoder 930 of the video decoding apparatus 900 may perform an operation of the decoder 24 of the video decoding apparatus 20.

The video decoding apparatus 900 involving video prediction based on coding units having a tree structure according to the embodiment includes the receiver 910, the image data and encoding information extractor 920, and the image data decoder 930. Hereinafter, for convenience of description, the video decoding apparatus 900 involving video prediction based on coding units having a tree structure according to the embodiment is referred to as the 'video decoding apparatus 900'.

Definitions of various terms, such as a coding unit, a depth, a prediction unit, a transformation unit, and various types of split information for decoding operations of the video decoding apparatus 900 according to an embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information about the coding units having a tree structure according to each largest coding unit, from the parsed bitstream. The extracted final depth and the extracted split information are output to the image data decoder 930. That is, the image data in a bitstream is split into the largest coding unit so that the image data decoder 930 may decode the image data for each largest coding unit.

Also, the image data and encoding information extractor 920 may extract information about an intra prediction mode and information about changing of a distribution of reference pixels needed for intra prediction, from the parsed bitstream.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding on each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data based on the read information about the partition mode, the prediction mode, and the transformation unit for each coding unit from among the coding units having the tree structure included in each largest coding unit. A decoding process may include a prediction process including intra prediction and motion compensation, and an inverse transformation process.

The image data decoder 930 may perform intra prediction or motion compensation according to a partition and a prediction mode of each coding unit, based on the information about the partition type and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

Figure 10:
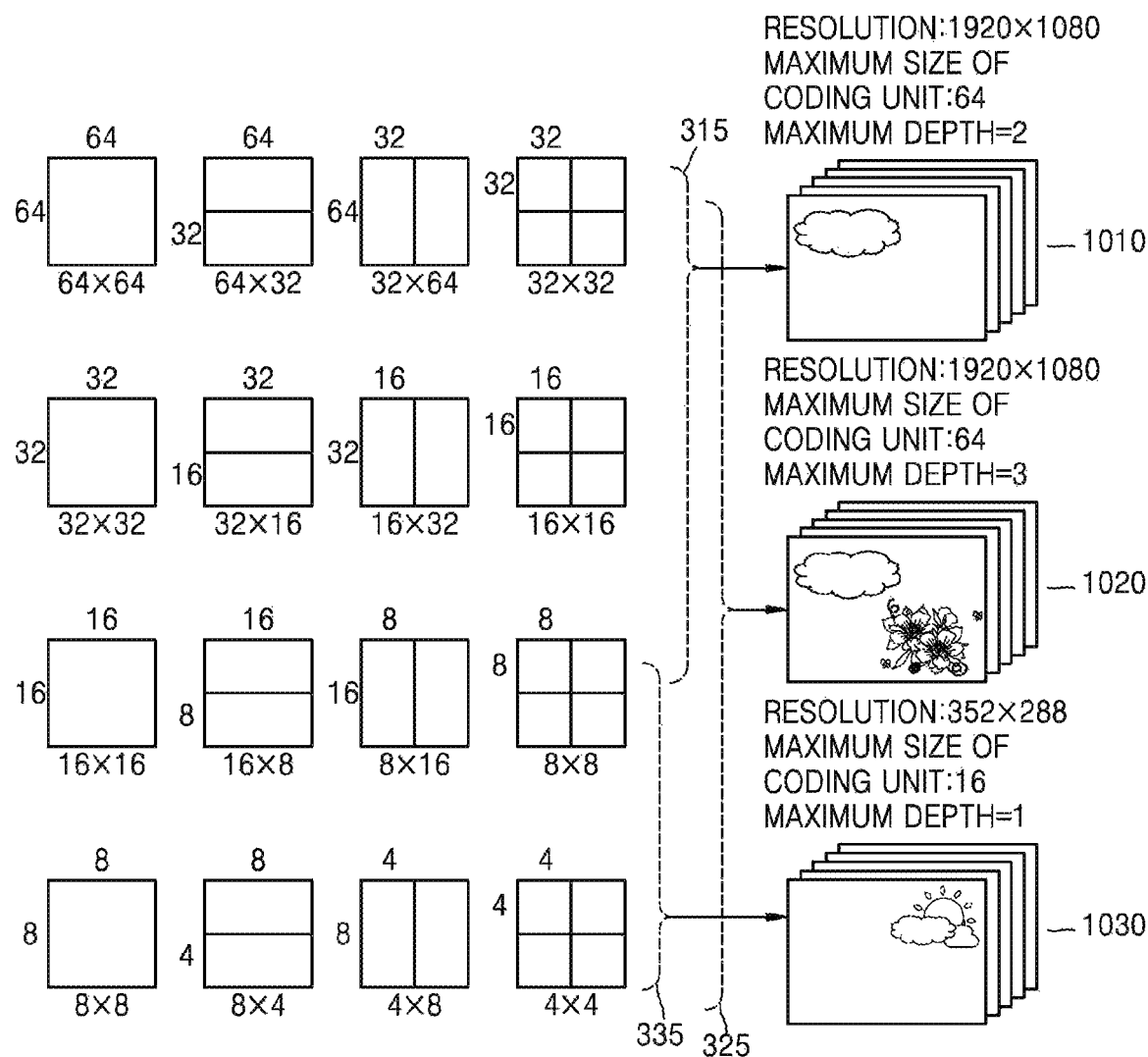
FIG. 10 illustrates a concept of coding units according to an embodiment.

FIG. 10 illustrates a concept of coding units according to an embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 1010 and 1020 having a higher resolution than the video data 1030 may be selected to 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
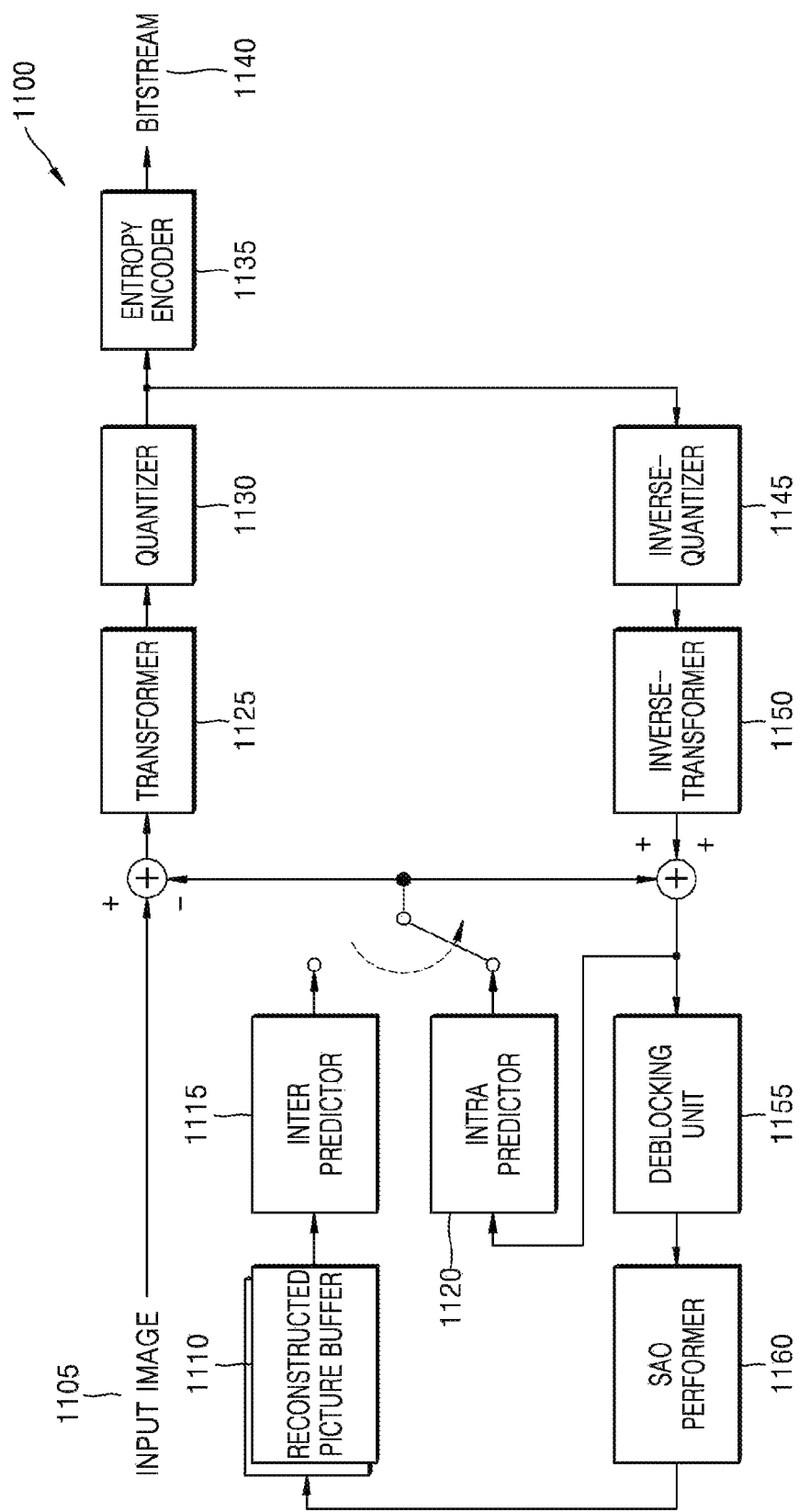
FIG. 11 is a block diagram of a video encoder 1100 based on coding units according to an embodiment.

FIG. 11 is a block diagram of a video encoder 1100 based on coding units according to an embodiment.

The video encoder 1100 according to the embodiment performs operations necessary for encoding image data in a picture encoder 1520 of the video encoding apparatus 800. That is, an intra predictor 1120 performs intra prediction on coding units in an intra mode according to prediction units, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, the largest coding unit that is to be split into coding units having a tree structure may be encoded.

Residue data is generated by removing prediction data regarding coding units of each mode that is output from the intra predictor 1120 or the inter predictor 1115 from data regarding encoded coding units of the current image 1105, and the residue data is output as a quantized transformation coefficient according to transformation units via a transformer 1125 and a quantizer 1130. The quantized transformation coefficient is reconstructed as the residue data in a spatial domain via an inverse-quantizer 1145 and an inverse-transformer 1150. The reconstructed residue data in the spatial domain is added to prediction data for coding units of each mode that is output from the intra predictor 1120 or the inter predictor 1115 and thus is reconstructed as data in a spatial domain for coding units of the current image 1105. The reconstructed data in the spatial domain is generated as reconstructed images via a deblocking unit 1155 and an SAO performer 1160. The reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 via an entropy encoder 1135.

In order for the image encoder 1100 to be applied in the video encoding apparatus 800, all elements of the image encoder 1100, i.e., the inter predictor 1115, the intra predictor 1120, the transformer 1125, the quantizer 1130, the entropy encoder 1135, the inverse-quantizer 1145, the inverse-transformer 1150, the deblocking unit 1155, and the SAO performer 1160, perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure by taking into account a maximum size and a maximum depth of a current largest coding unit, and the transformer 1125 may determine whether to split a transformation unit having a quadtree structure in each coding unit from among the coding units having a tree structure.

Figure 12:
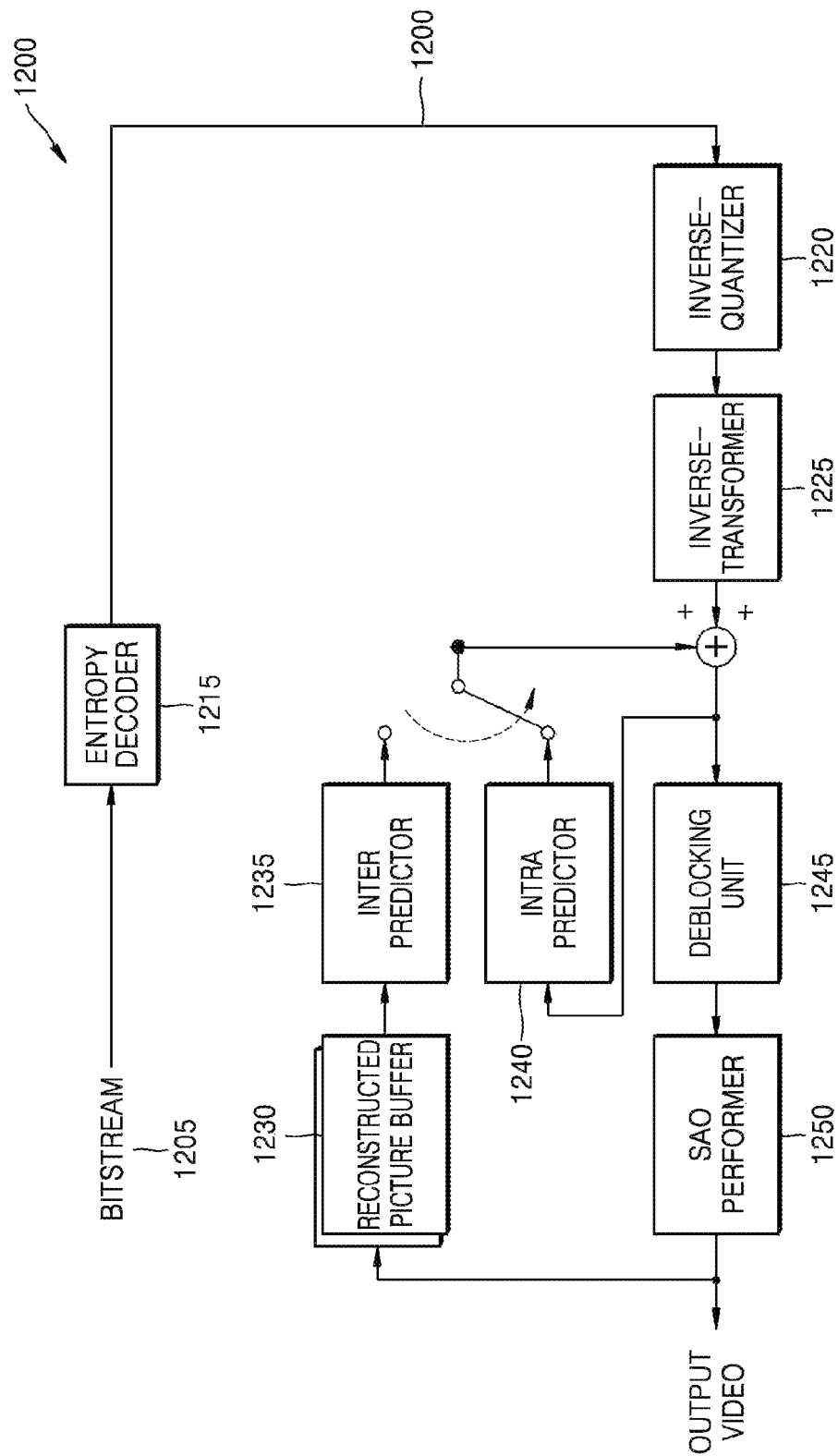
FIG. 12 is a block diagram of an image decoder 1200 based on coding units according to an embodiment.

FIG. 12 is a block diagram of an image decoder 1200 based on coding units according to an embodiment.

An entropy decoder 1215 parses decoding-target encoded image data and encoding information required for decoding from a bitstream 1205. The encoded image data is a quantized transformation coefficient, and an inverse-quantizer 1220 and an inverse-transformer 1225 reconstructs residue data from the quantized transformation coefficient.

An intra predictor 1240 performs intra prediction on coding units in an intra mode according to each prediction unit. An inter predictor 1235 performs inter prediction on coding units in an inter mode from among a current image for each prediction unit by using a reference image obtained from a reconstructed picture buffer 1230.

Prediction data and residue data regarding coding units of each mode which passed through the intra predictor 1240 or the inter predictor 1235 are summed, and thus data in a spatial domain regarding coding units of the current image 1105 may be reconstructed, and the reconstructed data in the spatial domain may be output as a reconstructed image 1260 via a deblocking unit 1245 and an SAO performer 1250. Reconstructed images stored in the reconstructed picture buffer 1230 may be output as reference images.

In order for a picture decoder 930 of the video decoding apparatus 900 to decode the image data, operations after the entropy decoder 1215 of the image decoder 1200 according to an embodiment may be performed.

In order for the image decoder 1200 to be applied in the video decoding apparatus 900 according to an embodiment, all elements of the image decoder 1200, i.e., the entropy decoder 1215, the inverse-quantizer 1220, the inverse-transformer 1225, the inter predictor 1240, the inter predictor 1235, the deblocking unit 1245, and the SAO performer 1250 may perform operations based on coding units having a tree structure for each largest coding unit.

In particular, the intra predictor 1240 and the inter predictor 1235 may determine a partition mode and a prediction mode for each of the coding units having a tree structure, and the inverse-transformer 1225 may determine whether to split a transformation unit according to a quad tree structure for each of the coding units.

Figure 13:
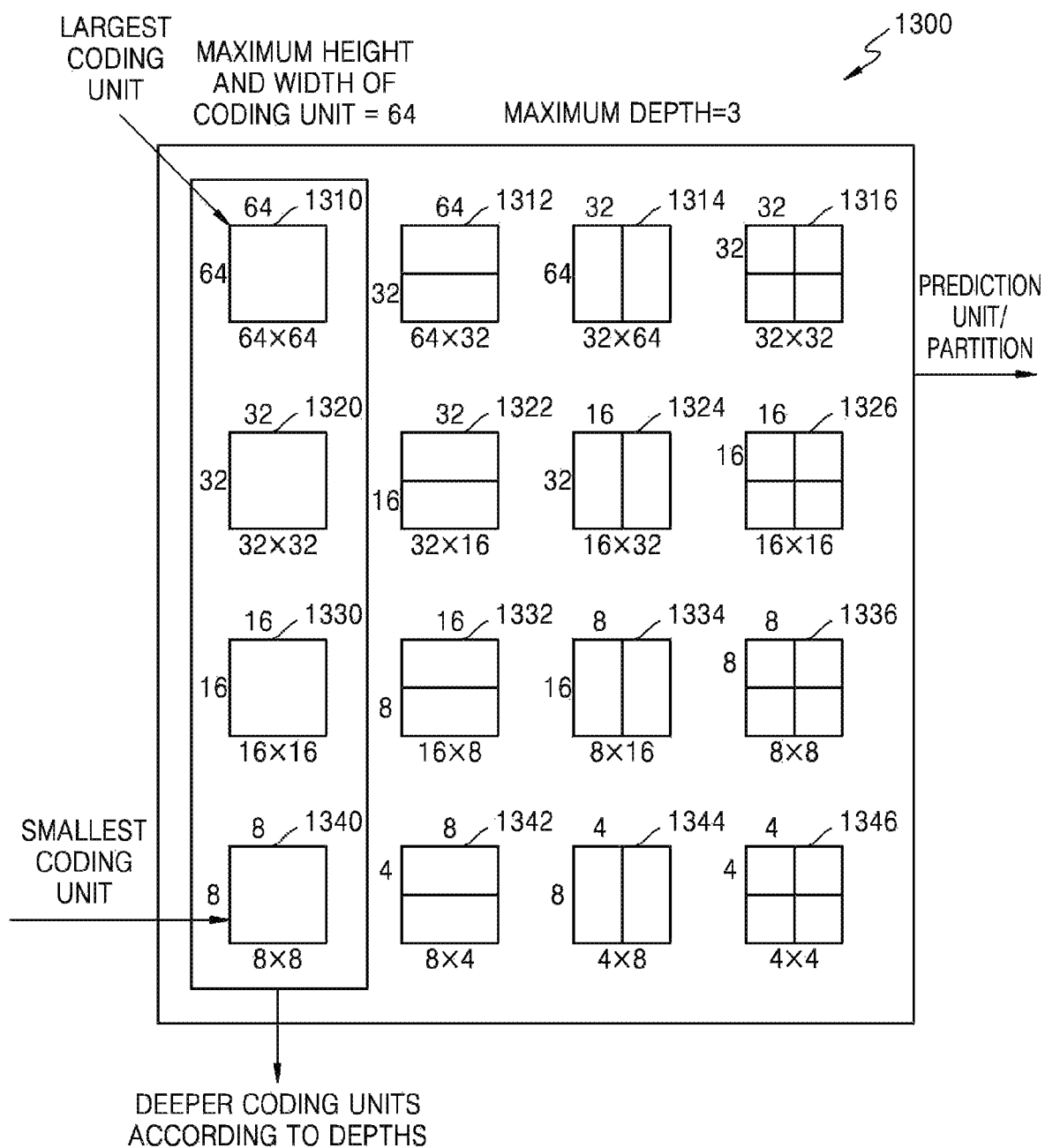
FIG. 13 illustrates deeper coding units according to depths, and partitions according to an embodiment.

FIG. 13 illustrates deeper coding units according to depths, and partitions according to an embodiment.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3 are present. The coding unit 1340 having a size of 8×8 and a depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions include in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8 included in the coding unit 1340, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
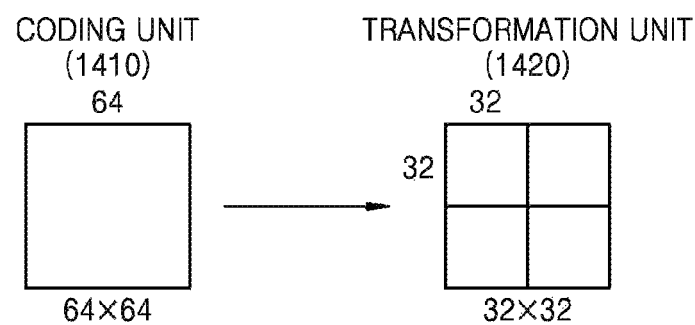
FIG. 14 illustrates a relationship between a coding unit and transformation units according to an embodiment.

FIG. 14 illustrates a relationship between a coding unit and transformation units according to an embodiment.

The video encoding apparatus 800 or the video decoding apparatus 900 encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

FIG. 15 illustrates a plurality of pieces of encoding information according to an embodiment.

The output unit 830 of the video encoding apparatus 800 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 about a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 1610 of the video decoding apparatus 900 according to an embodiment may extract and use the partition mode information 1500, the prediction mode information 1510, and the transformation unit size information 1520 for decoding according to each deeper coding unit.

Figure 16:
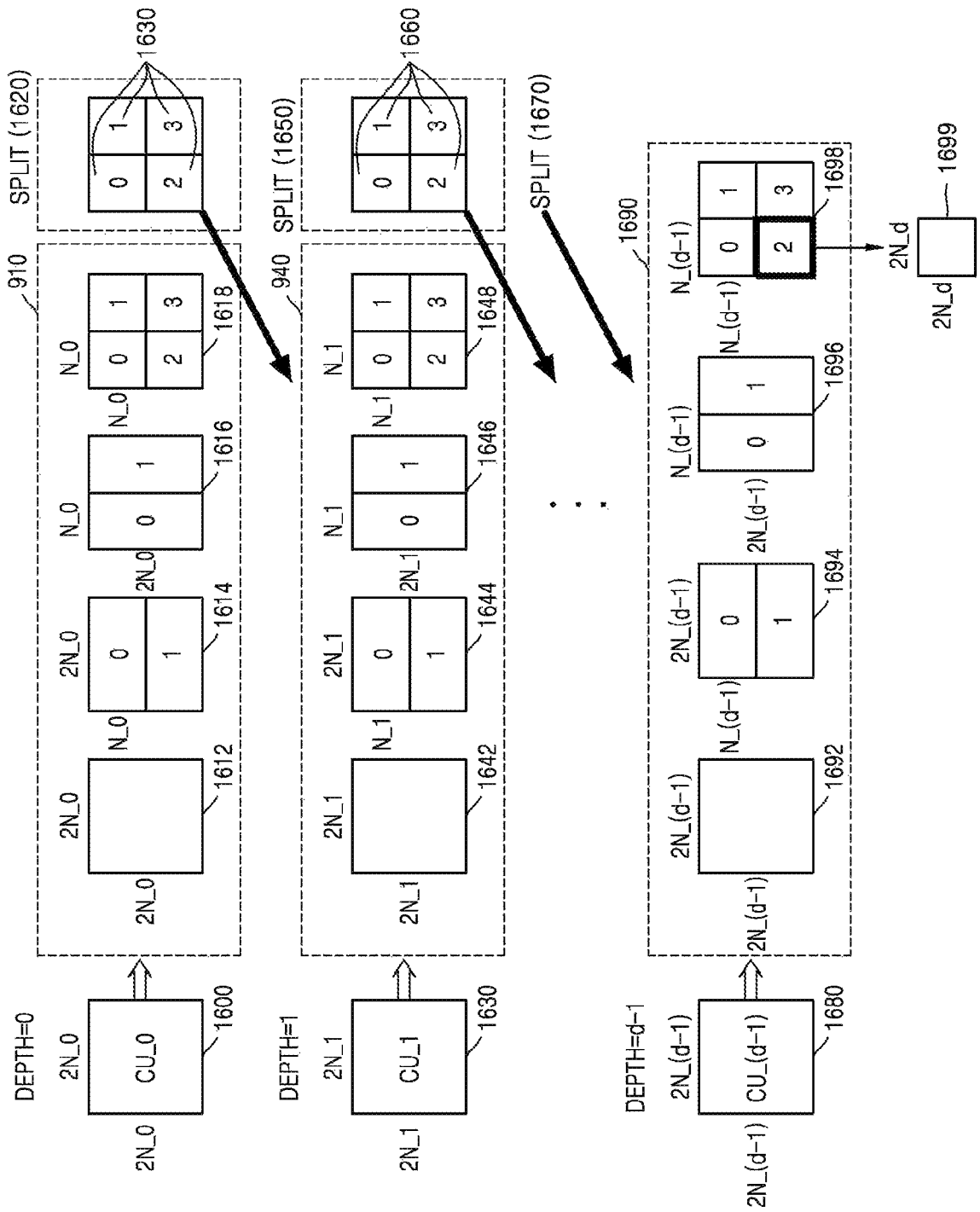
FIG. 16 illustrates deeper coding units according to depths according to an embodiment.

FIG. 16 illustrates deeper coding units according to depths according to an embodiment.

Split information may be used to represent a change in a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1640 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having the size of N_1×N_1, a depth is changed from 1 to 2 and split is performed (in operation 1650), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth generating the minimum encoding error by comparing encoding errors according to depths of the coding unit 1600 to determine a depth, and may set a corresponding partition mode and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the embodiment may extract and use a depth and prediction unit information about the coding unit 1600 so as to decode the coding unit 1612. The video decoding apparatus 900 according to the embodiment may determine a depth, in which split information is '0', as a depth by using split information according to depths, and may use, for decoding, split information about the corresponding depth.

obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 800 and the video decoding apparatus 900 according to the embodiments.

TABLE 1

| | Split Information 0 (Encoding on Coding Unit having Size of 2N × 2N and Current Depth of d) | | | | | Split Information 1 |
|---|---|---|---|---|---|---|
| | | | Size of Transformation Unit | | | |
| Prediction Mode | Partition Type | | Split Information 0 of Transformation Unit | Split Information 1 of Transformation Unit | | |
| | Symmetrical Partition Mode | Asymmetrical Partition Mode | | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | | Repeatedly Encode Coding Units having Lower Depth of d + 1 |

Figure 17:
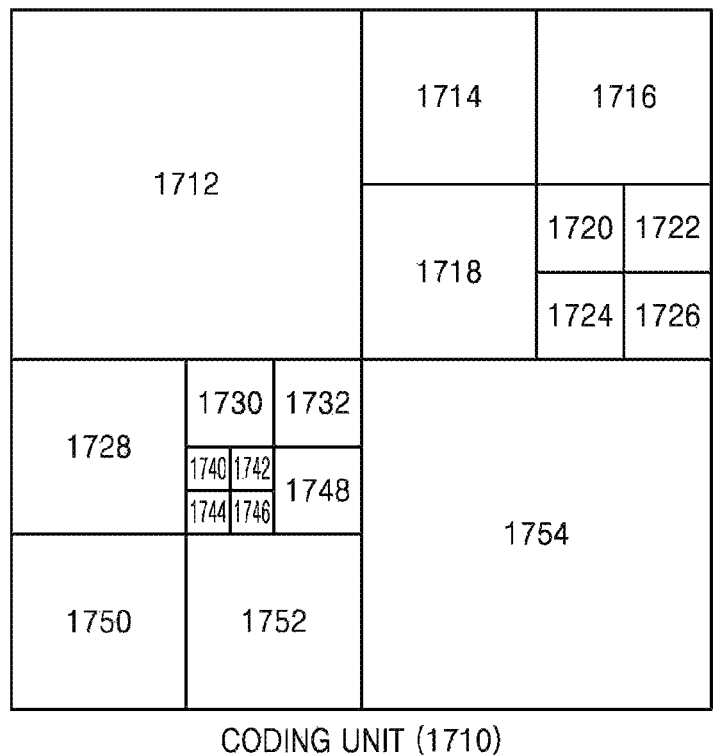
FIGS. 17, 18, and 19 illustrate a relationship between coding units, prediction units, and transformation units according to an embodiment.
Figure 18:
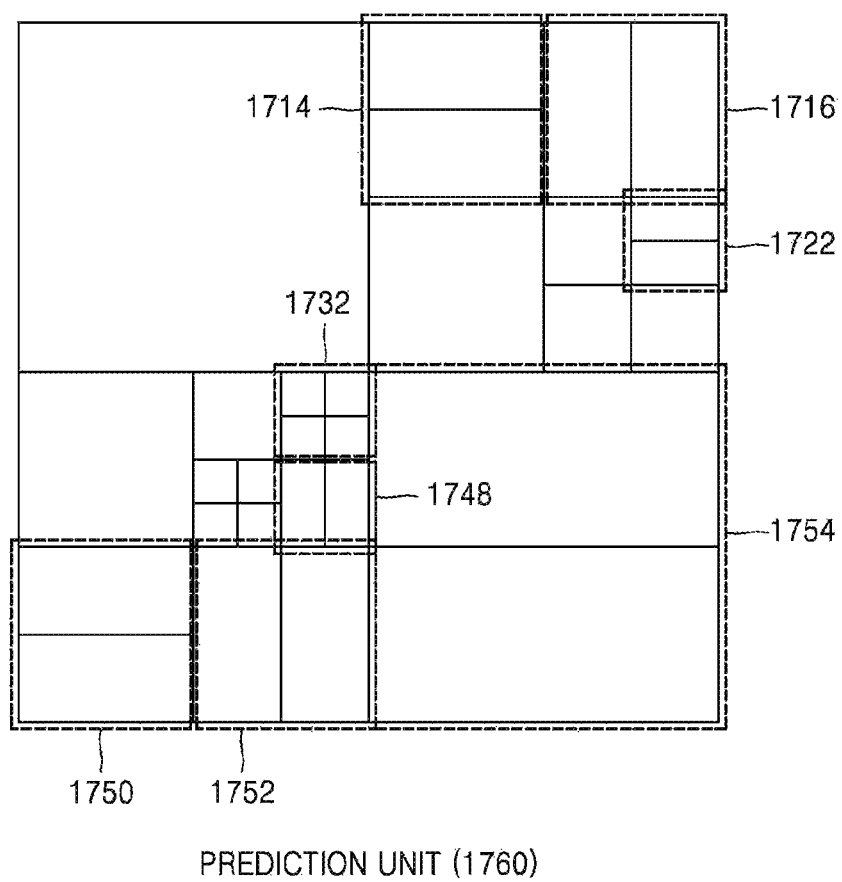
Figure 19:
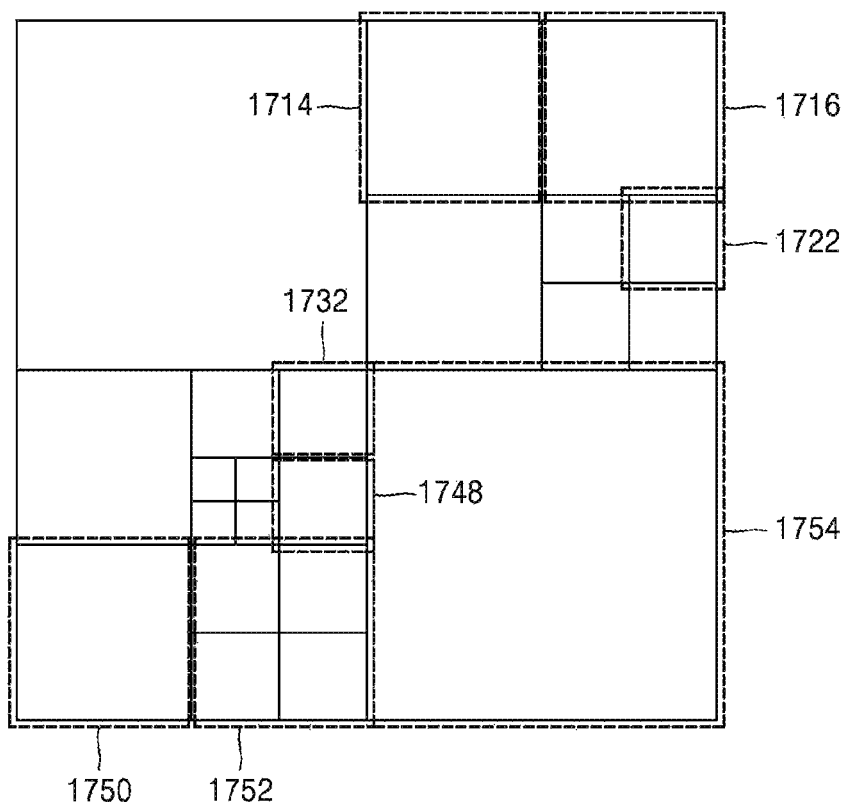

FIGS. 17, 18, and 19 illustrate a relationship between coding units, prediction units, and transformation units according to an embodiment.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 20:
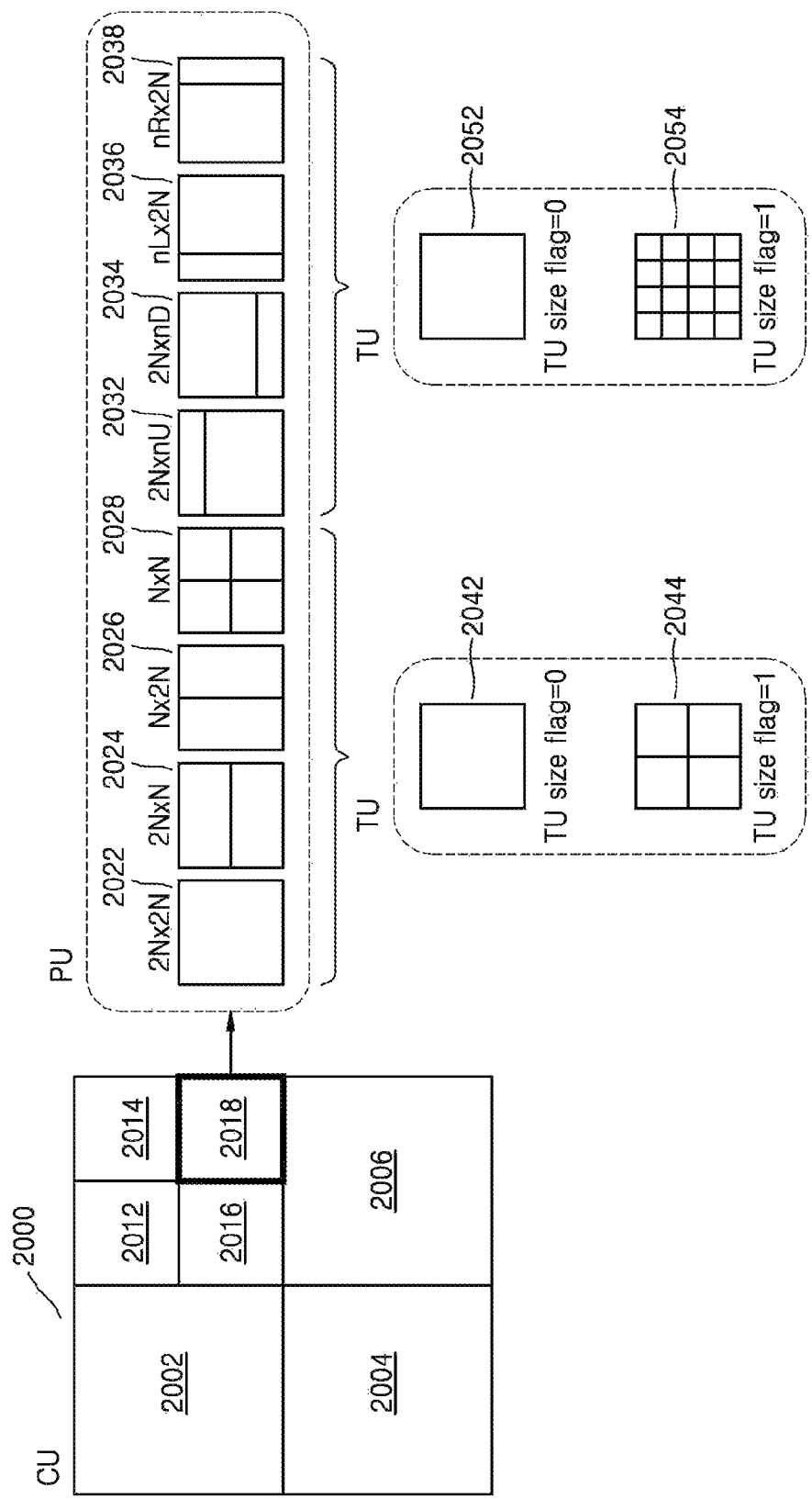
FIG. 20 illustrates a relationship between a coding unit, a prediction unit, and a transformation unit according to encoding mode information of Table 1.

FIG. 20 illustrates a relationship between a coding unit, a prediction unit, and a transformation unit according to encoding mode information of Table 1.

A largest coding unit 20300 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

CurrMinTuSize=max(MinTransformSize,RootTuSize/(2^MaxTransformSizeIndex))  (1)

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, In Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMin-TuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

RootTuSize=min(MaxTransformSize,PUSize)  (2)

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. 'PartitionSize' denotes the size of the current partition unit.

RootTuSize=min(MaxTransformSize,PartitionSize)  (3)

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

A video encoding method and a video decoding method may be implemented as computer-readable code on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. Also, the computer-readable recording medium may be a carrier wave that transmits data via the Internet, for example. Also, the computer-readable recording medium may be distributed among computer systems that are interconnected through a network so that processor-readable code is stored and executed in a distributed fashion.

While the present invention has been described in connection with preferred embodiments thereof, it will be understood by one of ordinary skill in the art that substitutes, changes, and modifications may be made without departing from the scope of the present invention defined by the claims. Hence, it will be understood that the description of the specification and the drawings is exemplary only and is not restrictive of the invention.

The invention claimed is:

1. A video decoding apparatus comprising at least one processor configured to:
   receive a bitstream of an encoded video;
   divide neighboring reference pixels into a plurality of sets based on pixel values of the neighboring reference pixels by comparing the pixel values with a specific value derived from the pixel values of the neighboring reference pixels;
   change a distribution of pixel values of the neighboring reference pixels that are previously decoded by changing the pixel values of pixels included in each of the plurality of sets by adding a predetermined offset value for each set;
   generate a prediction block by performing intra prediction on a current block by using the neighboring reference pixels, the distribution of the pixel values of which is changed; and
   reconstruct the current block based on residual data obtained from the bitstream and the prediction block,
   wherein the plurality of sets comprises a first set and a second set,
   wherein the at least one processor is further configured to divide the neighboring reference pixels into the first set in which pixels having pixel values less than an intermediate value between a first peak and a second peak are included, and the second set in which pixels having pixel values greater than the intermediate value are included, wherein the first peak indicates a pixel value at which the number of pixels is the largest in the distribution, and wherein the second peak indicates a pixel value at which the number of pixels is the second largest after the first peak in the distribution,
   wherein the at least one processor is further configured to change the distribution by adding a first offset value to the pixel values of the pixels included in the first set and adding a second offset value to the pixel values of the pixels included in the second set, and
   wherein each of the first offset value and the second offset value is a positive number or a negative number.

2. The video decoding apparatus of claim 1, wherein the plurality of sets comprises a third set and a fourth set,
   wherein the at least one processor is further configured to divide the neighboring reference pixels into the third set in which pixels having pixel values less than an average value of the pixel values of the neighboring reference pixels are included, and the fourth set in which pixels having pixel values greater than the average value are included, wherein the at least one processor is further configured to change the distribution by adding a third offset value to the pixel values of the pixels included in the third set and adding a fourth offset value to the pixel values of the pixels included in the fourth set, and wherein each of the third offset value and the fourth offset value is a positive number or a negative number.

3. The video decoding apparatus of claim 1, wherein the at least one processor is further configured to obtain a first flag comprising information about whether the distribution of the pixel values of the neighboring reference pixels is to be changed from the bitstream, and the at least one processor is further configured, when the first flag indicates that the distribution is to be changed, to change the distribution of the pixel values of the neighboring reference pixels, and when the first flag does not indicate that the distribution is not to be changed, not to change the distribution of the pixel values of the neighboring reference pixels.

4. The video decoding apparatus of claim 3, wherein the at least one processor is further configured to, when the first flag indicates that the distribution is to be changed, obtain a second flag indicating any mode from among a plurality of modes indicating a method of changing the distribution of the pixel values from the bitstream, and the at least one processor is further configured to change the distribution, according to the mode indicated by the second flag.

5. The video decoding apparatus of claim 1, wherein when the current block is an N×N block having a width and a height of N (where N is a positive number), the neighboring reference pixels comprise N×4+1 neighboring pixels comprising N+1 neighboring pixels located in an upper corner adjacent to the current block, N neighboring pixels located in an upper-right corner adjacent to the current block, N neighboring pixels located in a left corner adjacent to the current block, and N neighboring pixels located in a lower-left corner adjacent to the current block.

6. A video encoding apparatus comprising at least one processor configured to:

divide neighboring reference pixels into a plurality of sets based on pixel values of the neighboring reference pixels by comparing the pixel values with a specific value derived from the pixel values of the neighboring reference pixels;

change a distribution of pixel values of the neighboring reference pixels that are previously encoded by changing the pixel values of pixels included in each of the plurality of sets by adding a predetermined offset value for each set;

generate a prediction block by performing intra prediction on a current block by using the plurality of neighboring reference pixels, the distribution of the pixel values of which is changed; and generate a bitstream by encoding residual data between the prediction block and the current block, wherein the plurality of sets comprises a first set and a second set, wherein the at least one processor is further configured to divide the neighboring reference pixels into the first set in which pixels having pixel values less than an intermediate value between a first peak and a second peak are included, and the second set in which pixels having pixel values greater than the intermediate value are included, wherein the first peak indicates a pixel value at which the number of pixels is the largest in the distribution, and wherein the second peak indicates a pixel value at which the number of pixels is the second largest after the first peak in the distribution, wherein the at least one processor is further configured to change the distribution by adding a first offset value to the pixel values of the pixels included in the first set and adding a second offset value to the pixel values of the pixels included in the second set, and wherein each of the first offset value and the second offset value is a positive number or a negative number.

7. The video encoding apparatus of claim 6, wherein the plurality of sets comprises a third set and a fourth set, wherein the at least one processor is further configured to divide the plurality of neighboring reference pixels into the third set in which pixels having pixel values less than an average value of the pixel values of the plurality of neighboring reference pixels are included, and the fourth set in which pixels having pixel values greater than the average value are included, wherein the at least one processor is further configured to change the distribution by adding a third offset value to the pixel values of the pixels included in the third set and adding a fourth offset value to the pixel values of the pixels included in the fourth set, and wherein each of the third offset value and the fourth offset value is a positive number or a negative number.

8. The video encoding apparatus of claim 6, wherein the at least one processor is further configured to encode a first flag indicating information about whether the distribution of the pixel values of the plurality of neighboring reference pixels is to be changed and a second flag indicating any mode from among a plurality of modes indicating a method of changing the distribution.

9. The video encoding apparatus of claim 6, wherein when the current block is an N×N block having a width and a height of N (N is a positive number), the plurality of neighboring reference pixels comprise N×4+1 neighboring pixels comprising N+1 neighboring pixels located in an upper corner adjacent to the current block, N neighboring pixels located in an upper-right corner adjacent to the current block, N neighboring pixels located in a left corner adjacent to the current block, and N neighboring pixels located in a lower-left corner adjacent to the current block.

10. A video decoding method comprising:

receiving a bitstream of an encoded video;

dividing neighboring reference pixels into a plurality of sets based on pixel values of the neighboring reference pixels by comparing the pixel values with a specific value derived from the pixel values of the neighboring reference pixels;

changing a distribution of pixel values of the neighboring reference pixels that are previously decoded by changing the pixel values of pixels included in each of the plurality of sets by adding a predetermined offset value for each set;

generating a prediction block by performing intra prediction on a current block by using the neighboring reference pixels, the distribution of the pixel values of which is changed; and reconstructing the current block based on residual data obtained from the bit stream and the prediction block, wherein the plurality of sets comprises a first set and a second set, wherein the dividing the neighboring reference pixels comprises dividing the neighboring reference pixels into the first set in which pixels having pixel values less than an intermediate value between a first peak and a second peak are included, and the second set in which pixels having pixel values greater than the intermediate value are included, wherein the first peak indicates a pixel value at which the number of pixels is the largest in the distribution and wherein the second peak indicates a pixel value at which the number of pixels is the second largest after the first peak in the distribution, wherein the changing the distribution comprises changing the distribution by adding a first offset value to the pixel values of the pixels included in the first set and adding a second offset value to the pixel values of the pixels included in the second set, and wherein each of the first offset value and the second offset value is a positive number or a negative number.

11. The video decoding method of claim 10, wherein the plurality of sets comprises a third set and a fourth set, wherein the dividing the neighboring reference pixels comprises dividing the neighboring reference pixels into the third set in which pixels having pixel values less than an average value of the pixel values of the neighboring reference pixels are included, and the fourth set in which pixels having pixel values greater than the average value are included, wherein the changing the distribution further comprises changing the distribution by adding a third offset value to the pixel values of the pixels included in the third set and adding a fourth offset value to the pixel values of the pixels included in the fourth set, and wherein each of the third offset value and the fourth offset value is a positive number or a negative number.

12. The video decoding method of claim 10, the method further comprises obtaining a first flag comprising information about whether the distribution of the pixel values of the neighboring reference pixels is to be changed from the bitstream, and wherein the changing the distribution comprises, when the first flag indicates that the distribution is to be changed, to change the distribution of the pixel values of the neighboring reference pixels, and when the first flag does not indicate that the distribution is not to be changed, not to change the distribution of the pixel values of the neighboring reference pixels.

13. The video decoding method of claim 12, the method further comprises, when the first flag indicates that the distribution is to be changed, obtaining a second flag indicating any mode from among a plurality of modes indicating a method of changing the distribution of the pixel values from the bitstream, and wherein the changing the distribution comprises, changing the distribution according to the mode indicated by the second flag.

14. The video decoding method of claim 10, wherein when the current block is an N×N block having a width and a height of N (where N is a positive number), the neighboring reference pixels comprise N×4+1 neighboring pixels comprising N+1 neighboring pixels located in an upper corner adjacent to the current block, N neighboring pixels located in an upper-right corner adjacent to the current block, N neighboring pixels located in a left corner adjacent to the current block, and N neighboring pixels located in a lower-left corner adjacent to the current block.

15. A non-transitory computer-readable recording medium having embodied thereon a program for executing the video decoding method of claim 10 in a computer.

* * * * *